United States Patent
Pulleyn et al.

(10) Patent No.: US 9,063,965 B2
(45) Date of Patent: *Jun. 23, 2015

(54) MAINTAINING CONSISTENCY IN A DATABASE

(71) Applicant: Infoblox Inc., Santa Clara, CA (US)

(72) Inventors: Ivan W. Pulleyn, Sunnyvale, CA (US); Stuart M. Bailey, San Jose, CA (US); Morteza Ansari, Newark, CA (US); Etienne M. Liu, San Jose, CA (US); Ulf P. Ekberg, Soquel, CA (US); Srinath Gutti, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/929,432

(22) Filed: Jun. 27, 2013

(65) Prior Publication Data

US 2014/0012828 A1    Jan. 9, 2014

Related U.S. Application Data

(63) Continuation of application No. 12/953,303, filed on Nov. 23, 2010, now Pat. No. 8,498,971, which is a continuation of application No. 11/195,366, filed on Aug. 1, 2005, now Pat. No. 7,865,617, which is a continuation-in-part of application No. 10/866,307, filed on Jun. 10, 2004, now abandoned.

(60) Provisional application No. 60/562,739, filed on Apr. 16, 2004.

(51) Int. Cl.
*G06F 17/30* (2006.01)
*H04L 29/12* (2006.01)

(52) U.S. Cl.
CPC .... *G06F 17/30336* (2013.01); *H04L 29/12047* (2013.01); *H04L 61/15* (2013.01)

(58) Field of Classification Search
CPC combination set(s) only.
See application file for complete search history.

(56) References Cited

U.S. PATENT DOCUMENTS

| | | | |
|---|---|---|---|
| 6,262,976 B1 * | 7/2001 | McNamara | 370/254 |
| 6,374,295 B2 * | 4/2002 | Farrow et al. | 709/223 |
| 6,411,966 B1 * | 6/2002 | Kwan et al. | 1/1 |
| 6,446,141 B1 * | 9/2002 | Nolan et al. | 710/8 |
| 7,623,547 B2 * | 11/2009 | Dooley et al. | 370/466 |
| 2002/0010798 A1 * | 1/2002 | Ben-Shaul et al. | 709/247 |
| 2002/0069278 A1 * | 6/2002 | Forslow | 709/225 |
| 2005/0124382 A1 * | 6/2005 | Britt et al. | 455/556.2 |

* cited by examiner

*Primary Examiner* — Shyue Jiunn Hwa
(74) *Attorney, Agent, or Firm* — Van Pelt, Yi & James LLP

(57) ABSTRACT

Maintaining consistent DNS information is disclosed. Information associated with a resource is received. A resource record is populated with the information. View information is derived from the resource record.

27 Claims, 31 Drawing Sheets

MAINTAINING CONSISTENCY IN A DATABASE

CROSS REFERENCE TO OTHER APPLICATIONS

This application is a continuation of co-pending U.S. patent application Ser. No. 12/953,303, entitled MAINTAINING CONSISTENCY IN A DATABASE filed Nov. 23, 2010, which is a continuation of U.S. patent application Ser. No. 11/195,366, now U.S. Pat. No. 7,865,617, entitled MAINTAINING CONSISTENCY IN A DATABASE filed Aug. 1, 2005, which is a continuation in part of U.S. patent application Ser. No. 10/866,307 entitled MAINTAINING DATA INTEGRITY IN A DISTRIBUTED ENVIRONMENT filed Jun. 10, 2004, which claims priority to U.S. Provisional Patent Application No. 60/562,739, entitled MANAGING NETWORK IDENTITY INFRASTRUCTURE filed Apr. 16, 2004 all of which are incorporated herein by reference for all purposes.

BACKGROUND OF THE INVENTION

The Domain Name System (DNS) is a system that can map domain names to IP addresses. DNS systems include various records, including A records and PTR records. An A record or address record maps a host name to an IP address. A PTR record or pointer record maps an IP address to a name. A records and PTR records are typically created and managed independently of each other, often in separate databases. This can lead to inconsistent DNS information. An external script can be run to search for consistency problems. Unfortunately, these problems are discovered after the inconsistencies are already in operation. An improved method of maintaining consistency in a database is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
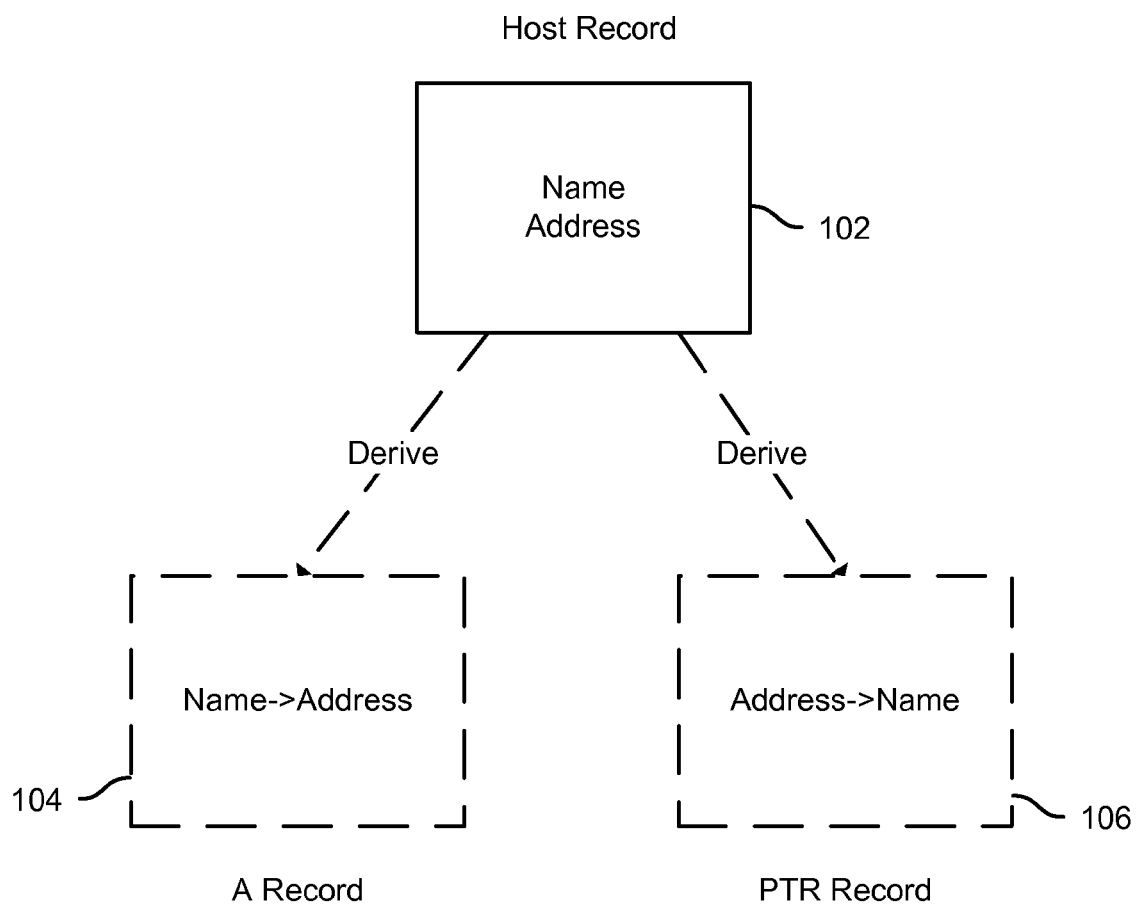
FIG. 1 is a diagram illustrating an example of a host record.

FIG. 1 is a diagram illustrating an example of a host record. In this example, host record 102 is shown to include a name and an address. From host record 102, A record 104 and PTR record 106 can be derived. A record 104 includes a mapping from a name to an address. PTR record 106 includes a mapping from an address to a name. In some embodiments, host record 102 is stored in a database, and there is no need to store A record 104 and PTR record 106. When a request for A record 104 or PTR record 106 is received, A record 104 or PTR record 106 can be derived from host record 102. A host record could also include other information, such as a MAC address, for other applications.

In some embodiments, host record 102 is part of a unified data model for a plurality of network applications, such as DNS, DHCP, and RADIUS. Each network application is associated with application specific information, some of which could be common to one or more other applications. Such information can be maintained in a unified data model. Views could be provided for accessing application specific information from each of the network resources. For example, a view could map information from the unified data model to an application specific view. Examples of views include a forward zone tree or a reverse zone tree, which are examples of DNS specific views. Views associated with other network services, such as DHCP, could also be provided.

Figure 2:
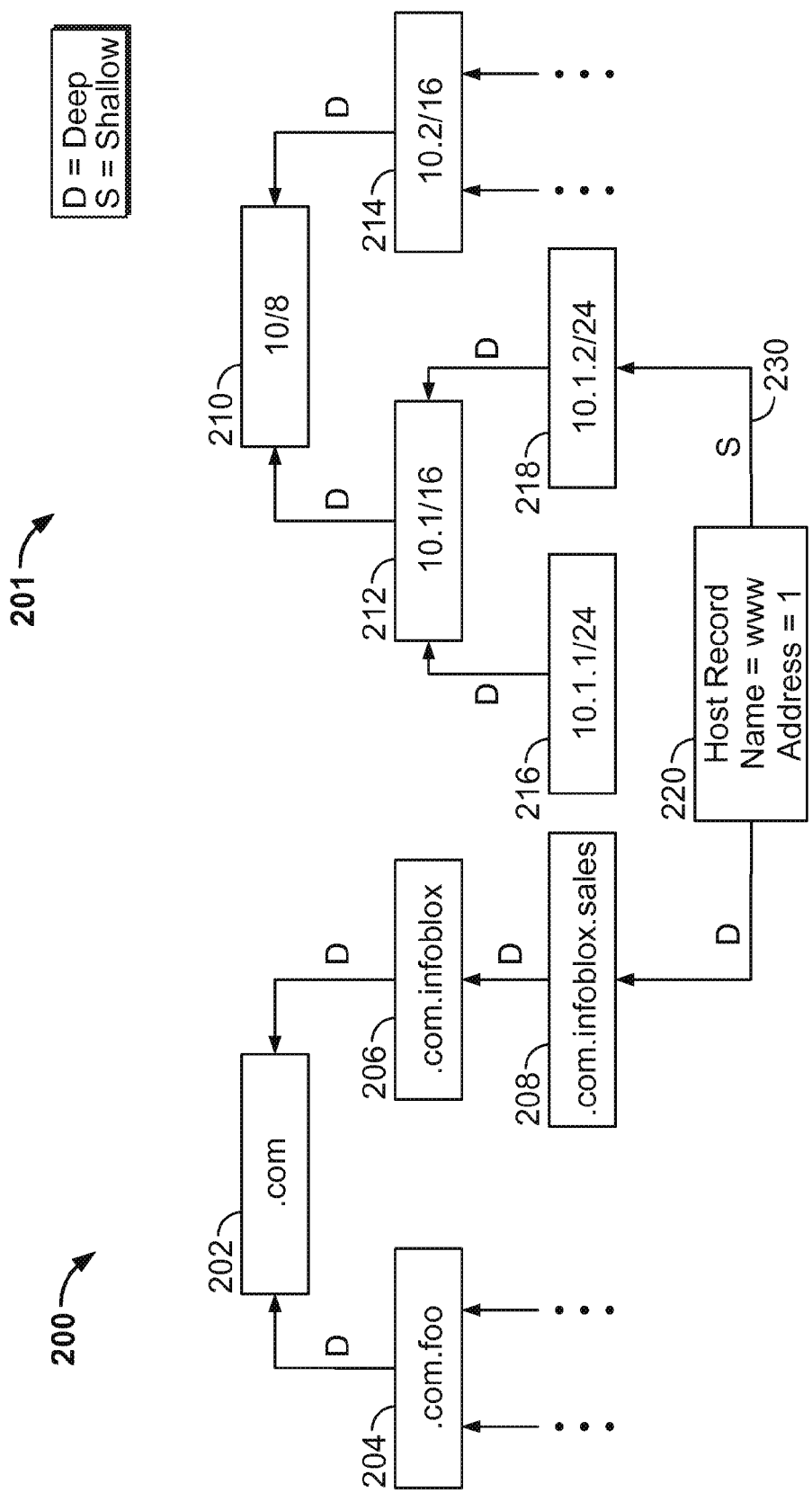
FIG. 2 is a diagram illustrating an example of a forward zone tree and a reverse zone tree.

FIG. 2 is a diagram illustrating an example of a forward zone tree and a reverse zone tree. Forward zone tree 200 is shown to include forward zones 202, 204, 206, 208, and other forward zones not shown. Forward zones can be stored as objects, records, or any other appropriate structure. A forward zone includes a name and a reference (e.g., a pointer). In this example, zone 208 has name "sales" and a reference to zone 206. Zone 206 has name "infoblox" and a reference to zone 202. Zone 202 has name "com" and does not reference another zone.

Reverse zone tree 201 is shown to include reverse zones 210, 212, 214, 216, 218, and other reverse zones not shown. Reverse zones can be stored as objects, records, or any other appropriate structure. A reverse zone includes a number and a reference (e.g., a pointer). In this example, zone 218 has number "2" and a reference to zone 212. Zone 212 has a number "1" and a reference to zone 210. Zone 210 has a number "10" and does not reference another zone.

Host 220 is shown to include a name and an address. Hosts can be stored as objects, records, or any other appropriate structure. In this example, host 220 has name "www", address "10.1.2.1", a reference to forward zone 208 of type "deep", and a reference to reverse zone 218 of type "shallow". In this example, when an object has a reference of type "deep", then if the referenced object is deleted, the object is deleted. When an object has a reference type of "shallow", then if the referenced object is deleted, the reference becomes null. In some embodiments, the reference is automatically re-routed, as more fully described below.

In this example, forward zone references to forward zones are all of type "deep". Reverse zone references to reverse zones are of type "deep".

Figure 3:
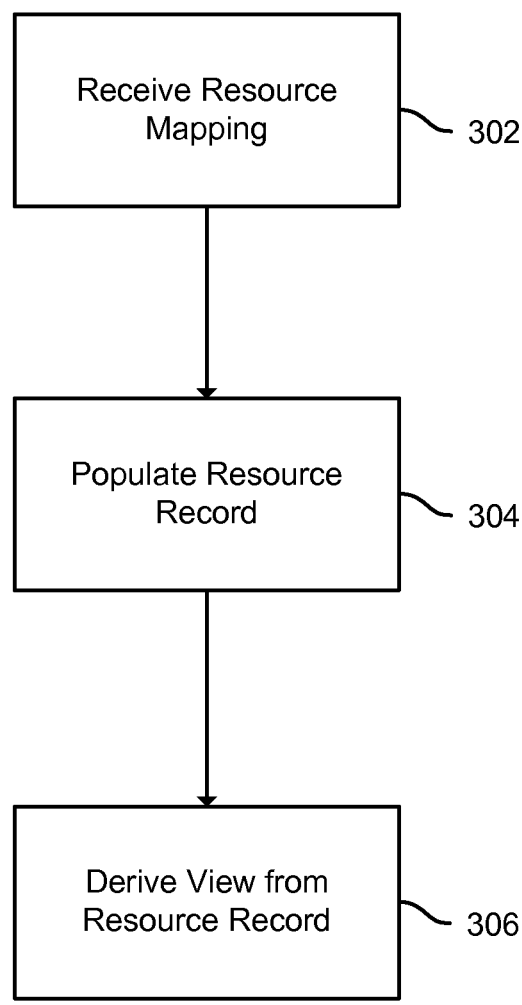
FIG. 3 is a flowchart illustrating an embodiment of a process for managing a resource record.

FIG. 3 is a flowchart illustrating an embodiment of a process for managing a resource record. A resource, as used herein, refers to any network resource that is associated with forward or reverse properties. Examples of resources include an A record, PTR record, MX record, TXT record, LOC record, AAA record, Glue record, NS record, host record, etc. Host records are more fully described below. For example, an A record includes a forward mapping from a name to an address. A PTR record includes a reverse mapping from an address to a name. A LOC record includes a mapping from a name to a location, etc.

The process begins at 302, in which a resource mapping is received. For example, a name to address mapping or an address to name mapping is received. The name could be a host name and the address could be an IP address, for example. The resource mapping could be part of a request to create a resource record or to modify a resource record. In various embodiments, the resource mapping could be sent using a programming interface, a script, a network protocol (e.g., Dynamic DNS), or a graphical user interface (GUI). Dynamic DNS could cause the resource mapping to be received.

At 304, a resource record is populated. For example, if a name to address mapping is received, a host record is populated with that name and address. The host record could be generated if it does not already exist or if a request to create the resource record is received. At 306, a view is derived from the resource record. For example, if the resource record is a host record, and a request to view a PTR record is received, the view of the PTR record is derived from the host record. Host, A and PTR records are described as an example, but this process can be applied to any resource record.

In some embodiments, multiple resource mappings are received at 302. For example, a set of host records could be created by providing a range of addresses.

Figure 4:
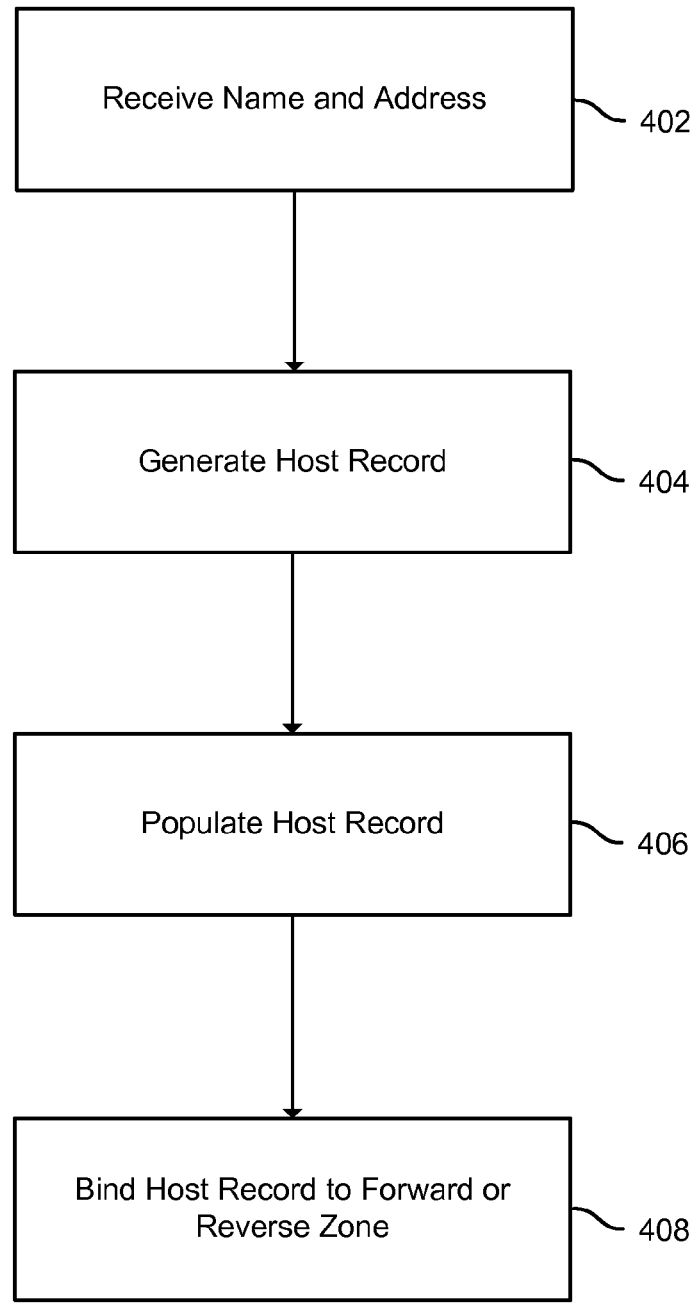
FIG. 4 is a flowchart illustrating an embodiment of a process for generating a host record.

FIG. 4 is a flowchart illustrating an embodiment of a process for generating a host record. In some embodiments, this process can be used to perform 302 and 304 for the case where the resource record is a host record. The process begins at 402, in which a name and address is received. In various embodiments, the request could be sent using a programming interface, a script (e.g., a text file with a list of host names and IP addresses), a network protocol (e.g., Dynamic DNS), or a graphical user interface (GUI). For example, a GUI could be provided for creating a host in which a user enters a name and an address. An example of a GUI is described below.

At 404, a host record is generated. For example, a host record is created in the database. At 406, the host record is populated. For example, the name and address fields of the host record are populated with the received name and address. At 408, the host record is bound to a forward and/or reverse zone. For example, the host record could include reference fields that reference forward and reverse zones, as shown in FIG. 2.

In some embodiments, after receiving a name and an address at 402, it is determined whether there is a conflict. If there is a conflict, the process ends. A user could be notified, or a log file could include a record of the conflict. For example, in some embodiments, A records or PTR records can also be stored along with host records in a database. When a request to add a host record that conflicts with an A record or PTR record is received, a conflict is detected.

Figure 5:
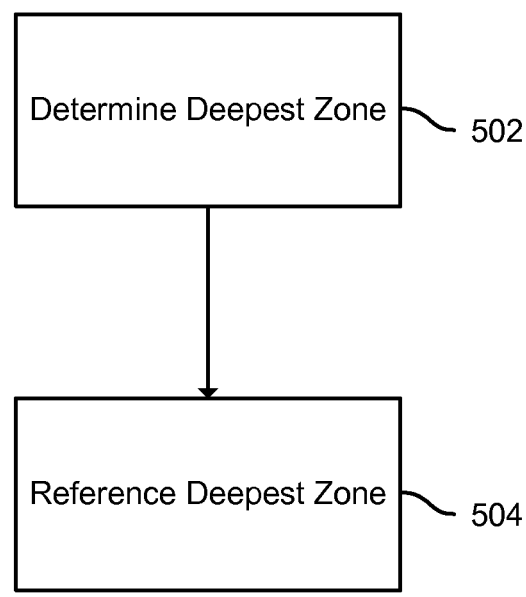
FIG. 5 is a flowchart illustrating an embodiment of a binding process.

FIG. 5 is a flowchart illustrating an embodiment of a binding process. In some embodiments, this process can be used to perform 408 for the forward zone or the reverse zone when generating a host. Process 500 begins at 502, in which the deepest zone is determined.

In the case of the forward zone, the deepest zone is the normalized zone when it exists. The normalized zone name is the longest zone name that can be truncated from the fully qualified domain name (FQDN). For example, in FIG. 2, suppose that a request to insert host record 220 under zone 208 is received. Host record 220 has FQDN "www.sales.infoblox.com". The normalized zone name is "sales.infoblox.com". The normalized host name is "www". The zone "sales.infoblox.com" exists in the forward zone tree, so the deepest zone is the same as the normalized zone, or zone 208.

In another example, suppose that a request to insert a host record with name "www.sales" under zone 206 is received. The FQDN is "www.sales.infoblox.com". The normalized zone name is "sales.infoblox.com" and the normalized host name is "www". In some embodiments, the deepest zone is zone 208. The host name becomes "www". If zone 208 does not exist, the deepest zone is zone 206, the next highest leaf in the forward zone tree. In some embodiments, the deepest zone is zone 206 and the host name remains the same. In this case, the zone tree may still be presented to the user as if the deepest zone is zone 208.

In some embodiments, an FQDN indexing structure to determine whether a host with the same FQDN already exists. For example, the FQDN indexing structure could include a list of all FQDNs in the system.

In the case of the reverse zone, the deepest zone is the lowest leaf in the reverse zone tree under which the host can be placed. For example, in FIG. 2, if a request to insert host 220 under zone 212 is received, it is determined that the deepest zone is zone 218. If a request to insert host 220 under zone 218 is received, it is determined that the deepest zone is zone 218.

At 504, the deepest zone is referenced. For example, the host record could include reference fields to reference the deepest forward and reverse zones, as shown in FIG. 2.

Figure 6:
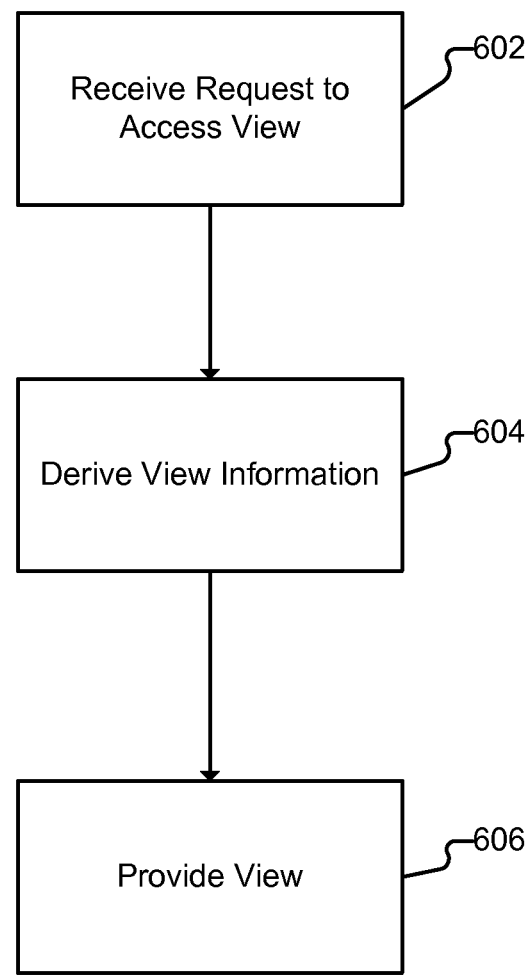
FIG. 6 is a flowchart illustrating an embodiment of process for accessing a resource record.

FIG. 6 is a flowchart illustrating an embodiment of process for accessing a resource record. In some embodiments, this process can be used to perform 306. The process begins at 602, in which a request to access a view is received. For example, a request for an A record or a PTR record could be received. At 604, the view information is derived. For example, if the request is for an A record, A record information is derived from a host record. At 606, the view is provided. For example, if the request is for an A record, the A record is provided.

Figure 7:
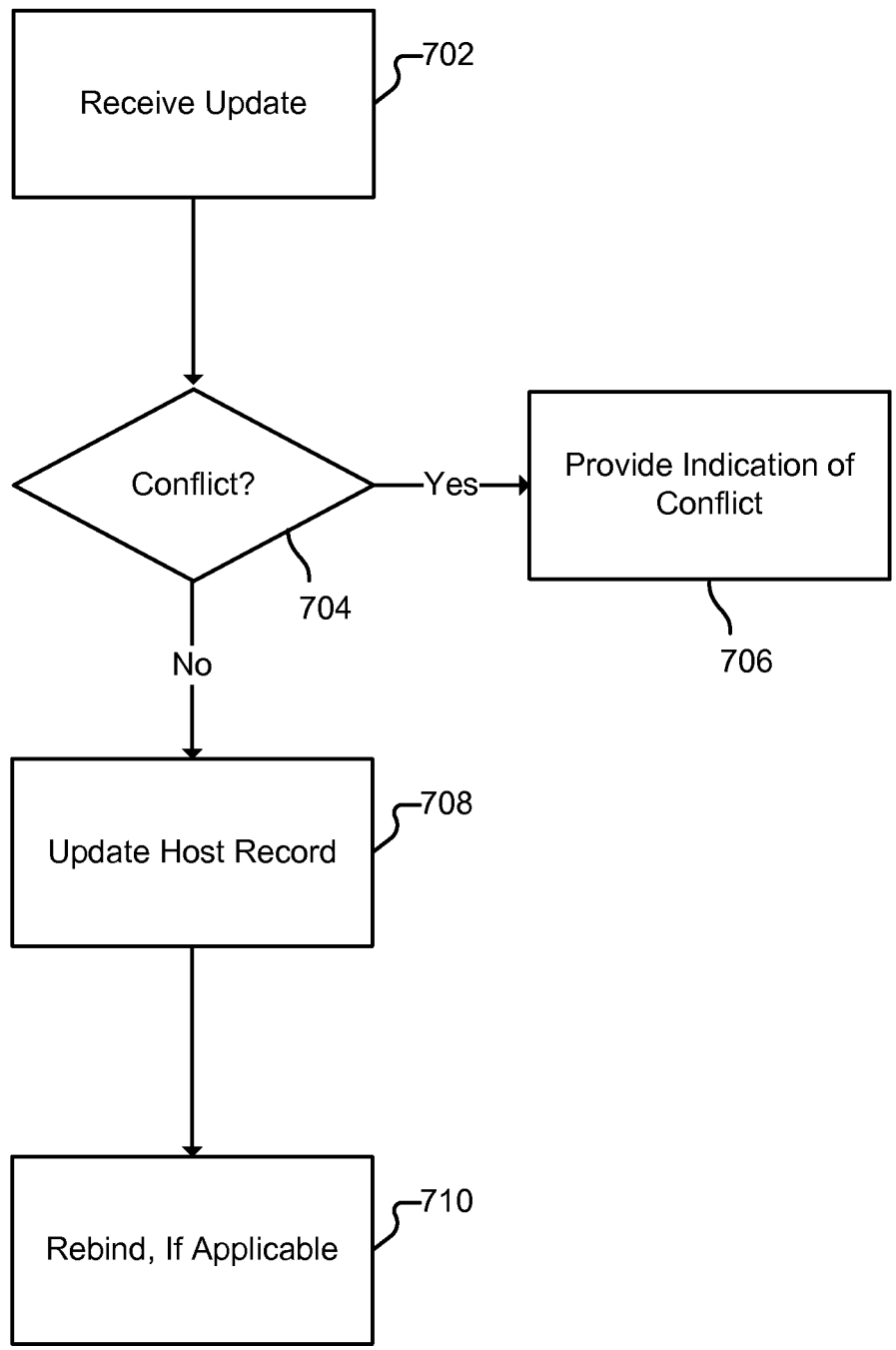
FIG. 7 is a flowchart illustrating an embodiment of a process for modifying a host.

FIG. 7 is a flowchart illustrating an embodiment of a process for modifying a host. In some embodiments, this process can be used to perform 302 and 304 for the case where the resource record is a host record. The process begins at 702, in which an update is received. For example, the update could include a new name and/or a new address. In various embodiments, the update could be sent using a programming interface, a script, a network protocol (e.g., Dynamic DNS), or a graphical user interface (GUI). Dynamic DNS could cause the update to be received.

At 704, it is determined whether there is a conflict. For example, there could already be a host record with the same FQDN. If it is determined that there is a conflict, then at 706, an indication of conflict is provided. For example, the user could be notified or an indication of conflict is written to a file or structure. If is determined that there is not a conflict, then at 708, the host record is updated. For example, the new name and/or new address are placed in the appropriate fields. At 710, the host record is rebound, if applicable. For example, if the address changes so that the host record should reference a different reverse zone, then that reverse zone reference is changed. In some embodiments, the host record is rebound according to process 500. In some embodiments, if the DNS server is not authoritative for the zone, then the host record is not rebound to that zone. For example, a host record does not necessarily have a shallow reference to a reverse zone if the DNS server is not authoritative for the reverse zone. In some embodiments, the instantiation of the zone in the database indicates that the DNS server is authoritative for that zone. In some embodiments, the zone could be instantiated for other reasons.

In some embodiments, a host can be modified by dragging an object in a GUI. For example, a GUI could display forward and reverse zone trees as shown in FIG. 2. A user could drag arrow 230 so that it points instead to reverse zone 216. In this example, this would cause the IP address of host record 220 to change from "10.1.2.1" to "10.1.1.1". A similar operation could be performed in the forward zone tree.

Figure 8:
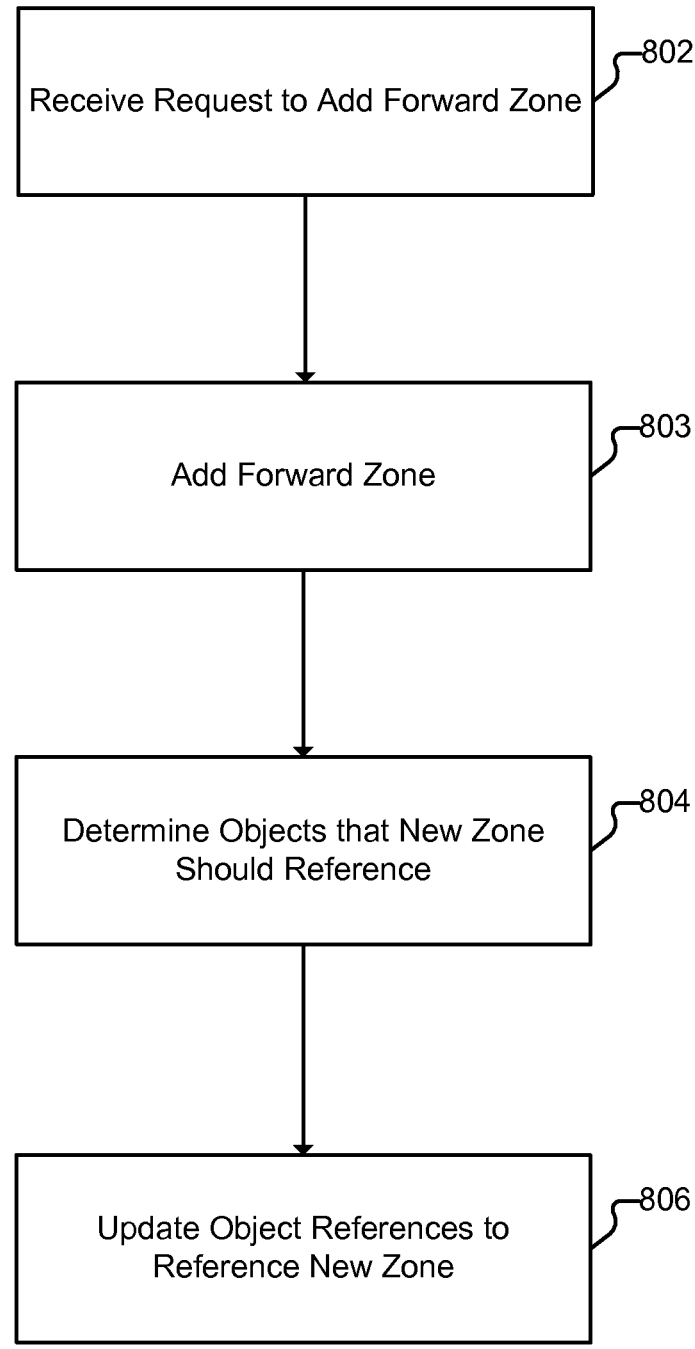
FIG. 8 is a flowchart illustrating an embodiment of a process for adding a forward zone.

FIG. 8 is a flowchart illustrating an embodiment of a process for adding a forward zone. The process begins at 802, in which a request to add a forward zone is received. The request could specify under which parent forward zone to insert the new forward zone. In various embodiments, the request could be sent using a programming interface, a script (e.g., a text file with a list of forward zones), a network protocol, or a graphical user interface (GUI).

At 803, the forward zone is inserted. At 804, objects (e.g., hosts, zones, etc.) that should reference the new forward zone are determined. For example, all the zones and/or hosts that reference the parent forward zone could be organized in a way that facilitates this. At 806, the object references are updated to reference the new forward zone.

For example, in FIG. 2, suppose that zone 206 does not exist and that zone 208 references zone 202 directly. At 802, a request to add zone 206 is received. At 803, zone 206 is inserted. At 804, it is determined that zone 208 should reference new zone 206. At 806, the reference in zone 208 is updated to reference zone 206. For example, a reference field or pointer is updated.

In another example, suppose that zone 208 does not exist and that host 220 references zone 206 directly. At 802, a request to add zone 208 is received. At 803, zone 208 is inserted. At 804, it is determined that host 220 should reference new zone 208. At 806, the forward zone reference in host 220 is updated to reference zone 208.

In some embodiments, a transactional engine ensures that 803 and 806 are either both performed successfully (in the case where it is determined an update is needed at 804), or fail and return to the previous state.

Figure 9:
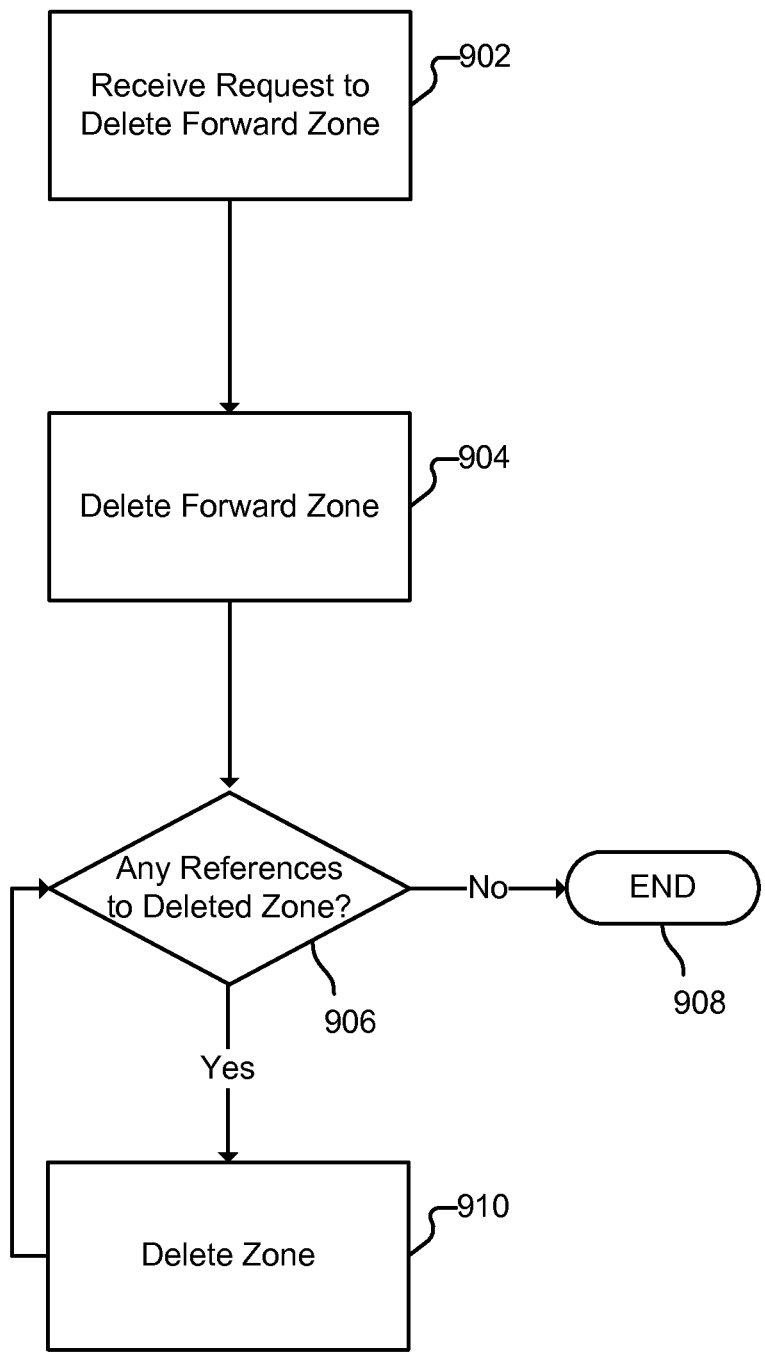
FIG. 9 is a flowchart illustrating an embodiment of a process for deleting a forward zone.

FIG. 9 is a flowchart illustrating an embodiment of a process for deleting a forward zone. In this example, objects referencing forward zones have reference type "deep". The process begins at 902, in which a request to delete a forward zone is received. In various embodiments, the request could be sent using a programming interface, a script (e.g., a text file with a list of forward zones), a network protocol (e.g., Dynamic DNS), or a graphical user interface (GUI).

At 904, the forward zone is deleted. At 906, it is determined whether there are any objects (e.g., hosts, zones, etc.) that reference the deleted zone. If it is determined that there are no objects that reference the deleted zone, then at 908, the process ends. If it is determined that there are objects that reference the deleted zone, then at 910, those objects are deleted. In this example, the objects that reference the deleted forward zone have reference type "deep", so the objects are deleted when the forward zone is deleted. The process returns to 906, in which it is determined whether there are any objects that reference the zone that was just deleted.

For example, in FIG. 2, suppose that a request to delete forward zone 206 is received. At 904, zone 206 is deleted. At 906, it is determined that zone 208 references zone 206. At 910, zone 208 is deleted. At 906, it is determined that host 220 references deleted zone 208. At 910, host 220 is deleted. At 906, it is determined that no object references host 220. In some embodiments, after a host is deleted there is no need to check for objects that reference the host because there are no objects that reference hosts. At 920, the process ends.

Figure 10:
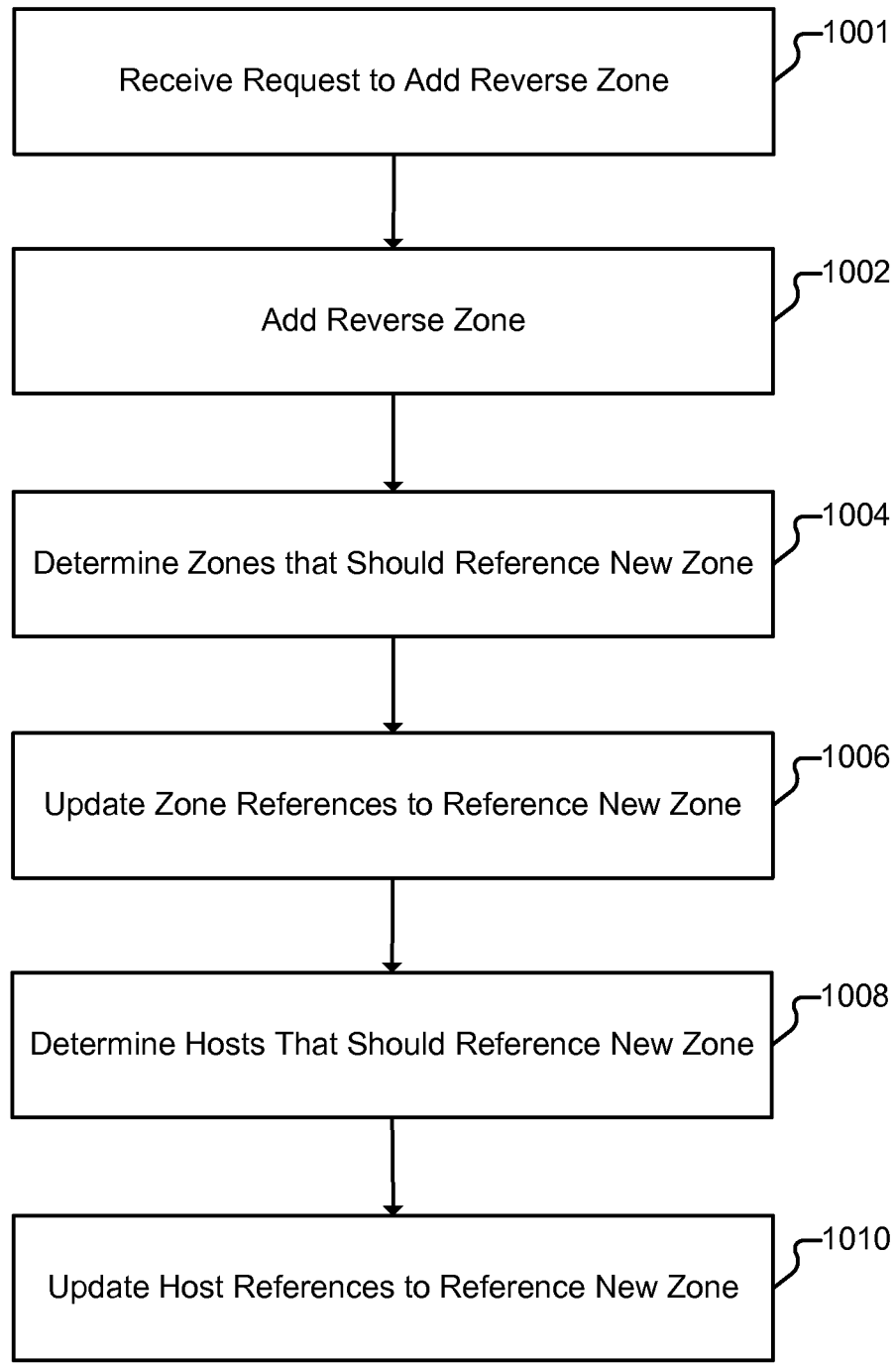
FIG. 10 is a flowchart illustrating an embodiment of a process for adding a reverse zone.

FIG. 10 is a flowchart illustrating an embodiment of a process for adding a reverse zone. The process begins at 1001, in which a request to add a reverse zone is received. The request could specify under which parent reverse zone to insert the new reverse zone. In various embodiments, the request could be sent using a programming interface, a script (e.g., a text file with a list of reverse zones), a network protocol, or a graphical user interface (GUI).

At 1002, the reverse zone is inserted. At 1004, zones that should reference the new reverse zone are determined. For example, all the zones that reference the parent reverse zone could be organized in a way that facilitates this. At 1006, the zone references are updated to reference the new reverse zone.

At 1008, hosts that should reference the new reverse zone are determined. Host records do not always include a reference to a reverse zone, as described above. In some embodiments, hosts that reference the parent reverse zone are pre-indexed in an indexing structure. In some embodiments, the indexing structure is organized by address ranges. Hosts that should reference the new reverse zone can be determined based on the indexing structure. Then at 1010, the host references are updated to reference the new reverse zone.

For example, in FIG. 2, suppose that zone 212 does not exist and that zone 218 references zone 210 directly and zone 216 references 210 directly. At 1001, a request to add zone 212 is received. At 1002, zone 212 is inserted. At 1004, it is determined that zones 218 and 216 should reference new zone 212. At 1006, the references in zones 218 and 216 are updated to reference zone 212. For example, a reference field or pointer is updated.

In another example, suppose that zone 218 does not exist and that host 220 references zone 212 directly. At 1001, a request to add zone 218 is received. At 1002, zone 218 is inserted. At 1004, it is determined that host 220 should reference new zone 218. At 1006, the reverse zone reference in host 220 is updated to reference zone 218.

In another example, suppose that host record 220 is modified to have address "11.1.2.1". In this case, the reverse zone reference of host record 220 is changed to null since there is no "11/8" root in this tree. If a reverse zone "11/8" is later added, the process of FIG. 10 would update host record 220 to reference the new reverse zone.

Figure 11:
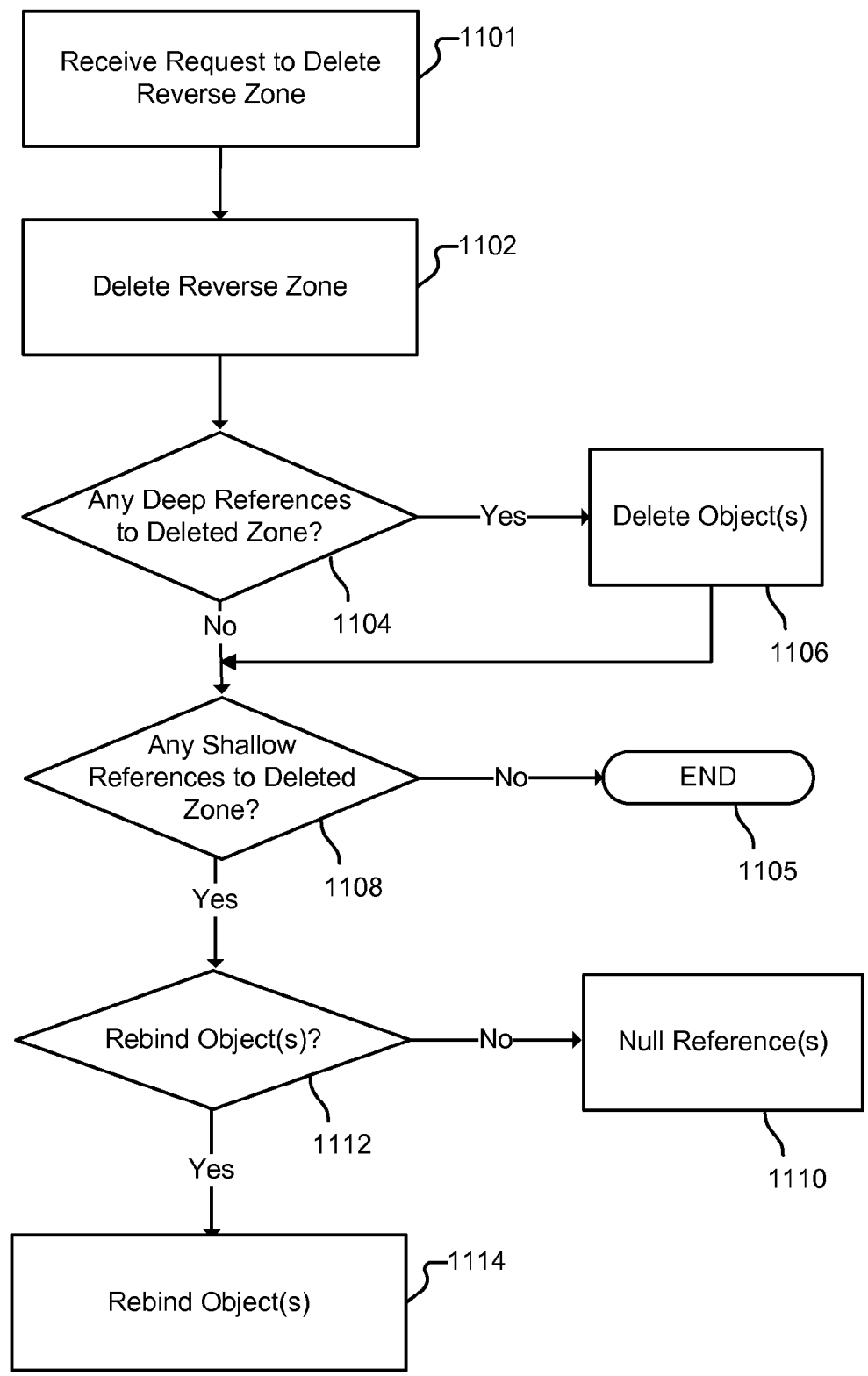
FIG. 11 is a flowchart illustrating an embodiment of a process for deleting a reverse zone.

FIG. 11 is a flowchart illustrating an embodiment of a process for deleting a reverse zone. In this example, zones referencing reverse zones have reference type "deep". Hosts referencing reverse zones have reference type "shallow". The process begins at 1101, in which a request to delete a reverse zone is received. In various embodiments, the request could be sent using a programming interface, a script (e.g., a text file with a list of reverse zones), a network protocol, or a graphical user interface (GUI).

At 1102, the reverse zone is deleted. At 1104, it is determined whether there are any deep references to the deleted zone. In other words, it is determined whether there are any objects (e.g., hosts, zones, etc.) with a deep reference to the deleted zone.

If it is determined that there are deep references to the deleted zone, then at 1106, objects that have deep references to the deleted zone are deleted. The process continues at 1108.

If it is determined that there are no deep references to the deleted zone, then at 1108, it is determined whether there are any shallow references to the deleted zone. If it is determined that there are no shallow references to the deleted zone, then at 1105, the process ends.

If it is determined that there are objects with shallow references to the deleted zone, then at 1112, it is determined whether such objects should be re-bound to a new object. For example, there could be a checkbox or flag in the object that indicates whether to rebind when the parent of the object is deleted. If it is determined that the object should not be re-bound, then at 1110, the reference is nulled. If it is determined that the reference should be re-bound, then at 1112, the reference is re-bound. For example, the reference is changed to reference a new zone. In some embodiments, process 500 is used to re-bind the object to a new object.

For each deleted zone, the process returns to 1104. For example, at 1106, if a zone is deleted, the process returns to 1104 for that zone.

For example, in FIG. 2, suppose that a request to delete zone 212 is received. At 1102, zone 212 is deleted. At 1104, it is determined that zones 216 and 218 have "deep" references to zone 212. At 1106, zones 216 and 218 are deleted. At 1108, it is determined that there are no shallow references to zone 212 and the process ends at 1105.

For each deleted zone, the process returns to 1104. For deleted zone 216, at 1104, it is determined that there are no deep references to deleted zone 216. At 1108, it is determined that there are no shallow references to deleted zone 216 and the process ends at 1105. For deleted zone 218, at 1104, it is determined that there are no deep references to zone 218. At 1108, it is determined that host 220 has a shallow reference to zone 218. At 1108, it is determined that a checkbox in host 220 indicates that the host should be rebound. At 1114, host 220 is rebound to zone 210.

Figure 12:
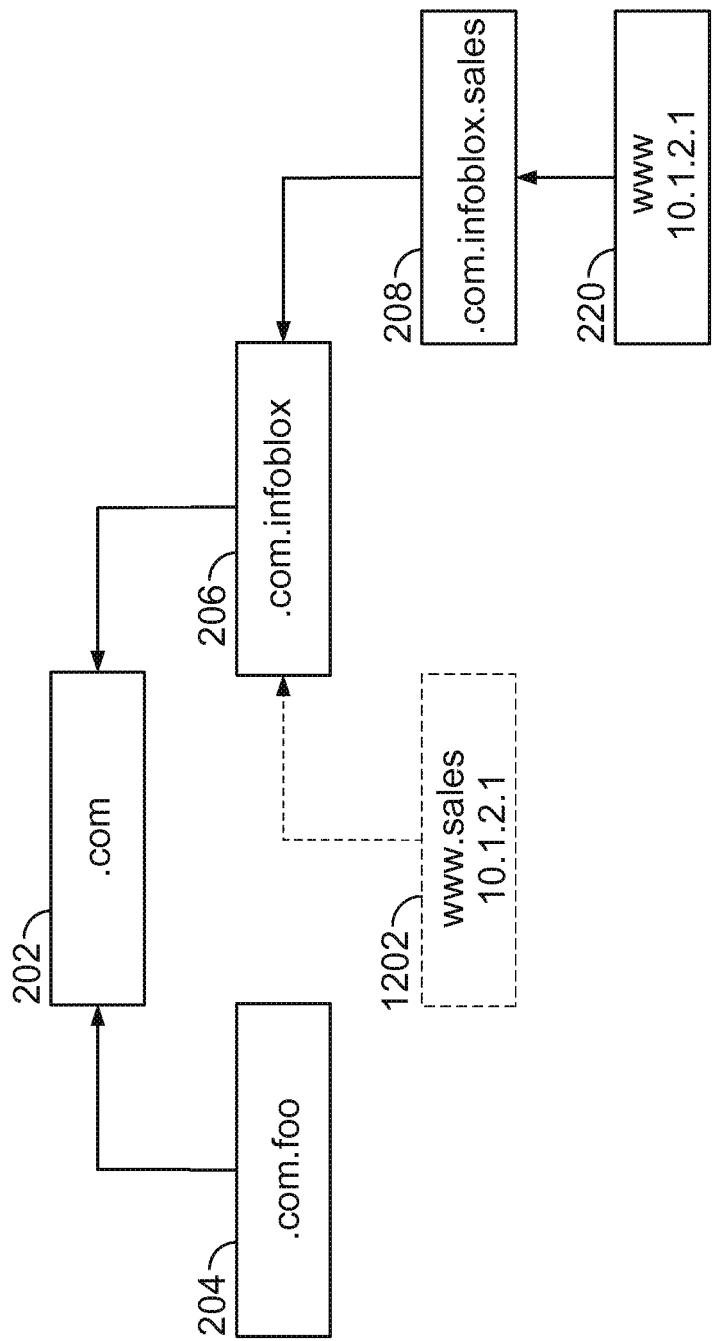
FIG. 12 is a diagram illustrating an example of a conflict.

FIG. 12 is a diagram illustrating an example of a conflict. In this example, a portion of forward zone tree 200, including forward zones 202, 204, 206, 208, and host 220 are shown. A host 1202 with name "www.sales" is shown. An administrator is attempting to insert host 1202 under zone 206 without realizing that there is a conflict with host 220. In other words, both host 220 and host 1202 have FQDN "www.sales.infoblox.com". However, this conflict can be detected, as described below.

Figure 13:
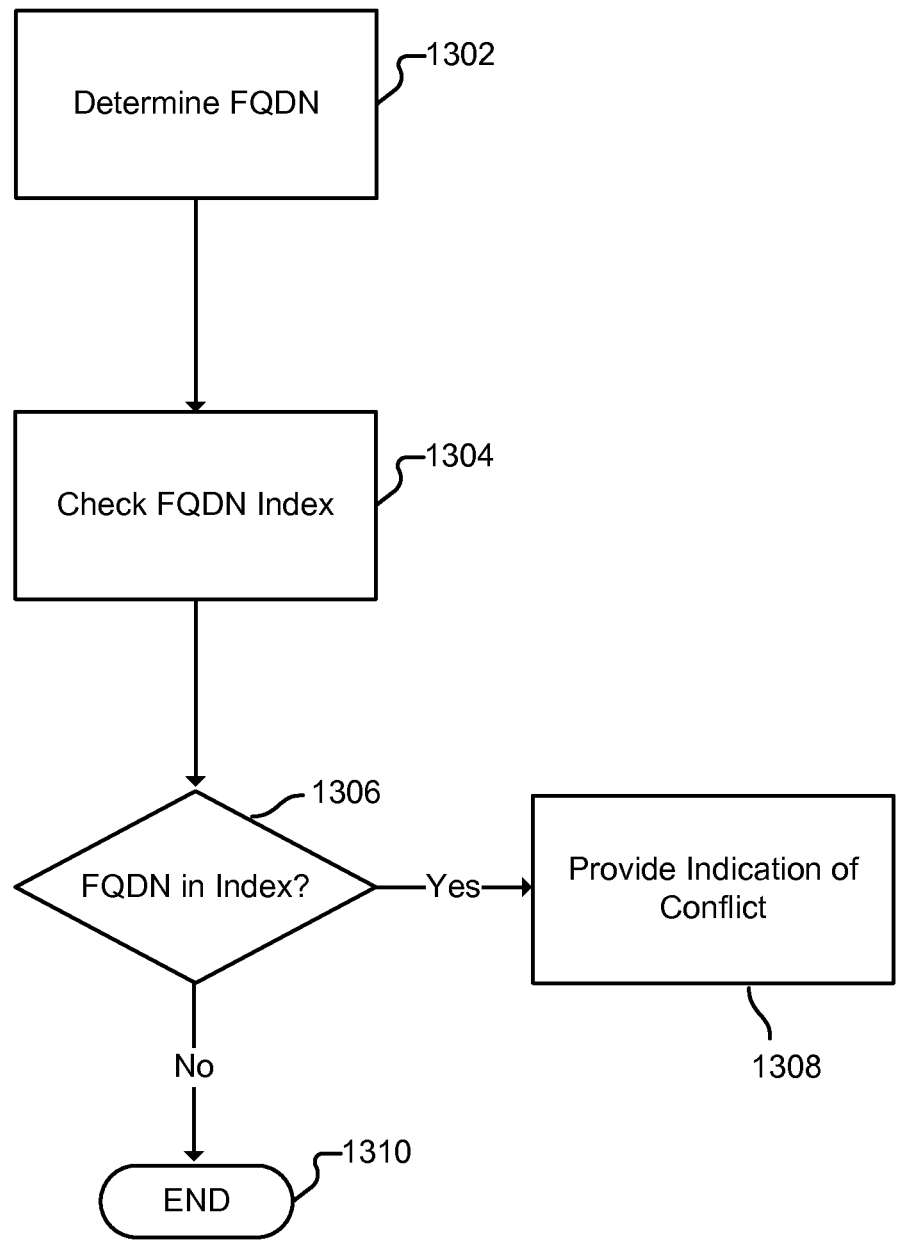
FIG. 13 is a flowchart illustrating an embodiment of a process for detecting a conflict.

FIG. 13 is a flowchart illustrating an embodiment of a process for detecting a conflict. In this example, an FQDN conflict is detected. In some embodiments, this process is performed when a request to add a host is received (for example, after performing 402). The process begins at 1302, in which the FQDN of the host is determined. At 1304, an FQDN index is checked. The FQDN index includes all FQDNs of hosts associated with the forward and reverse zone trees. At 1306, it is determined whether the FQDN of the host already exists in the FQDN index. If it is determined that the FQDN of the host already exists in the FQDN index, then at 1308, an indication that there is a conflict is provided. For example, a user is notified or an indication is written to a file or other structure. If it is determined that there is the FQDN of the host does not already exist in the FQDN index, then the process ends at 1310. In some embodiments, the process continues at 404.

In some embodiments, a conflict in the reverse zone can be detected in a similar way. For example, an index of IP addresses that are in use can be maintained.

FIGS. 7 and 13 are examples of integrity checking that can be performed at runtime. In other words, the conflict can be detected online. There is no need to run an external script to search for consistency problems.

Figure 14A:
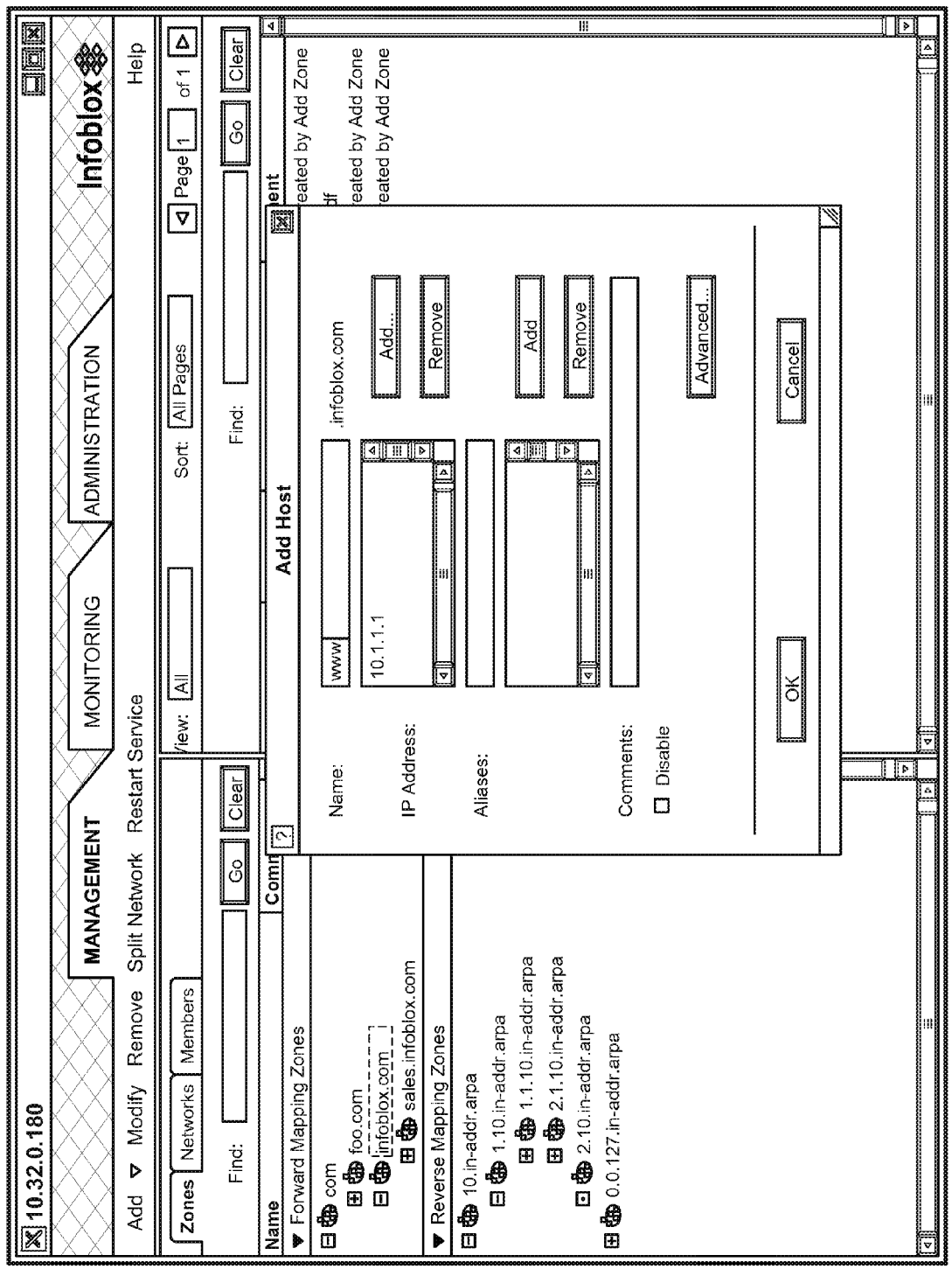
FIG. 14A is a diagram illustrating an embodiment of a GUI for adding a resource record.

FIG. 14A is a diagram illustrating an embodiment of a GUI for adding a resource record. In this example, the resource record is a host. A hierarchical view (or tree view) of the forward and reverse zones is shown on the left hand side of the GUI. The user selects under "Forward Mapping Zones" the zone "infoblox.com" on the left hand side, and then selects "Add Host" which could be an option under the "Add" menu, for example. The Add Host dialog opens and a name and an IP Address can be entered. In this case name "www" and IP Address "10.1.1.1" are entered. In this example, "infoblox.com" is pre-provided. In some embodiments, the FQDN is entered. The user selects the "OK" button to add the host. In some embodiments, the process of FIG. 4 is then performed.

In some embodiments, the user could select under "Reverse Mapping Zones" the zone "1.1.10.in-addr.arpa", and then select "Add Host". In this case, the name "www.infoblox.com" and IP address "1" could be entered to generate the same host.

Figure 14B:
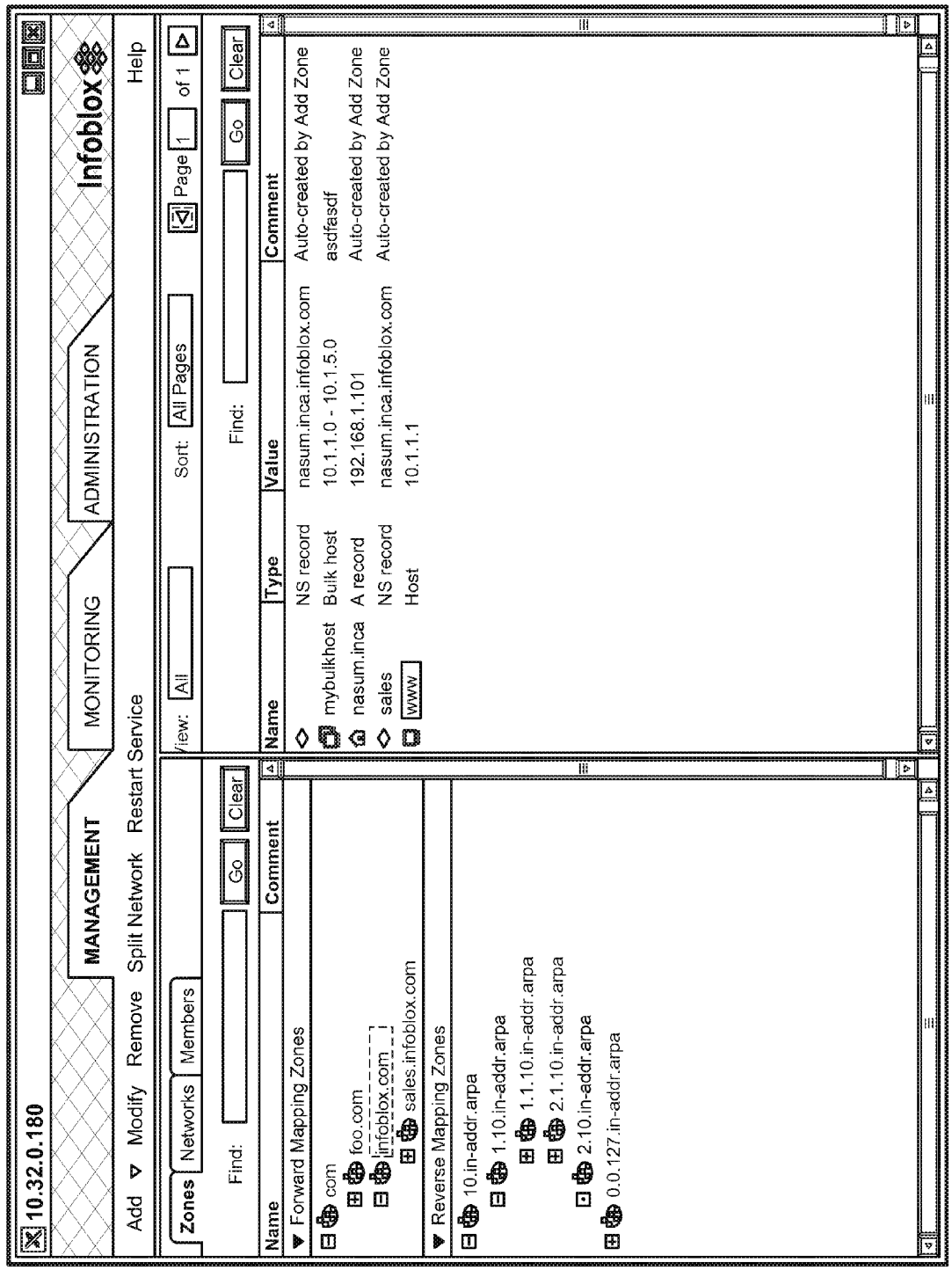
FIG. 14B is a diagram illustrating an embodiment of a GUI for viewing a resource record by forward zone.

FIG. 14B is a diagram illustrating an embodiment of a GUI for viewing a resource record by forward zone. In this example, the resource record shown is a host. The forward zone "infoblox.com" has been selected on the left hand side. The host added in FIG. 14A is shown selected on the right hand side.

Figure 14C:
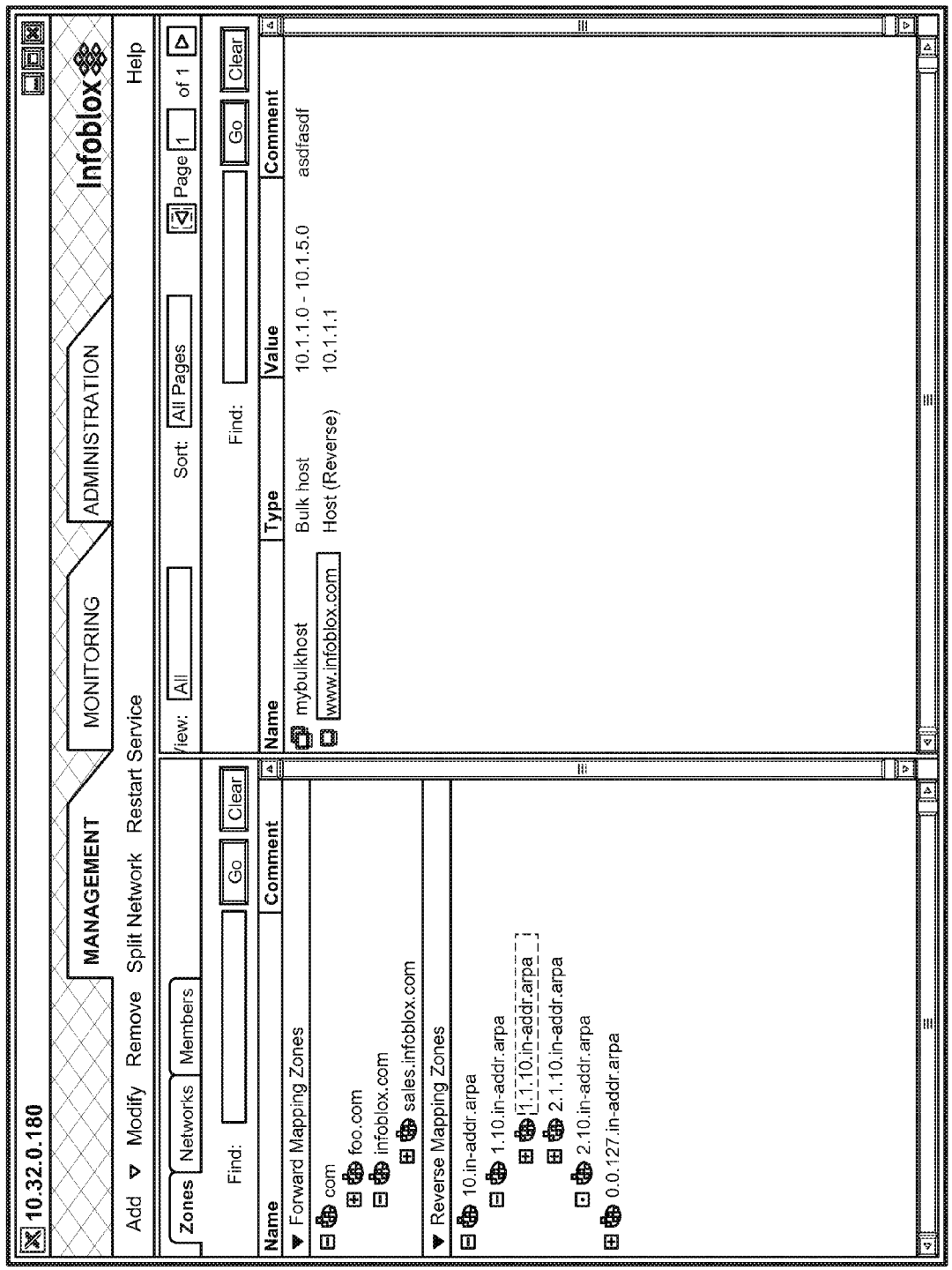
FIG. 14C is a diagram illustrating an embodiment of a GUI for viewing a resource record by reverse zone.

FIG. 14C is a diagram illustrating an embodiment of a GUI for viewing a resource record by reverse zone. In this example, the resource record shown is a host. The reverse zone "1.1.10.in-addr.arpa" has been selected on the left hand side. The host added in FIG. 14A is shown on the right hand side. When the host was added in FIG. 14A, it was determined that the host should be bound to zone "1.1.10.in-addr.arpa". In some embodiments, binding occurs according to 408.

Maintaining Data Integrity in a Distributed Environment

A backing store may be used to facilitate maintaining data integrity among a plurality of network applications. In some embodiments, the backing store is a common memory that is accessible to each network application. A network application sends a request to the backing store and the request is interpreted and executed according to the request. By maintaining a common backing store, memory and data integrity can be more efficiently managed.

Figure 15A:
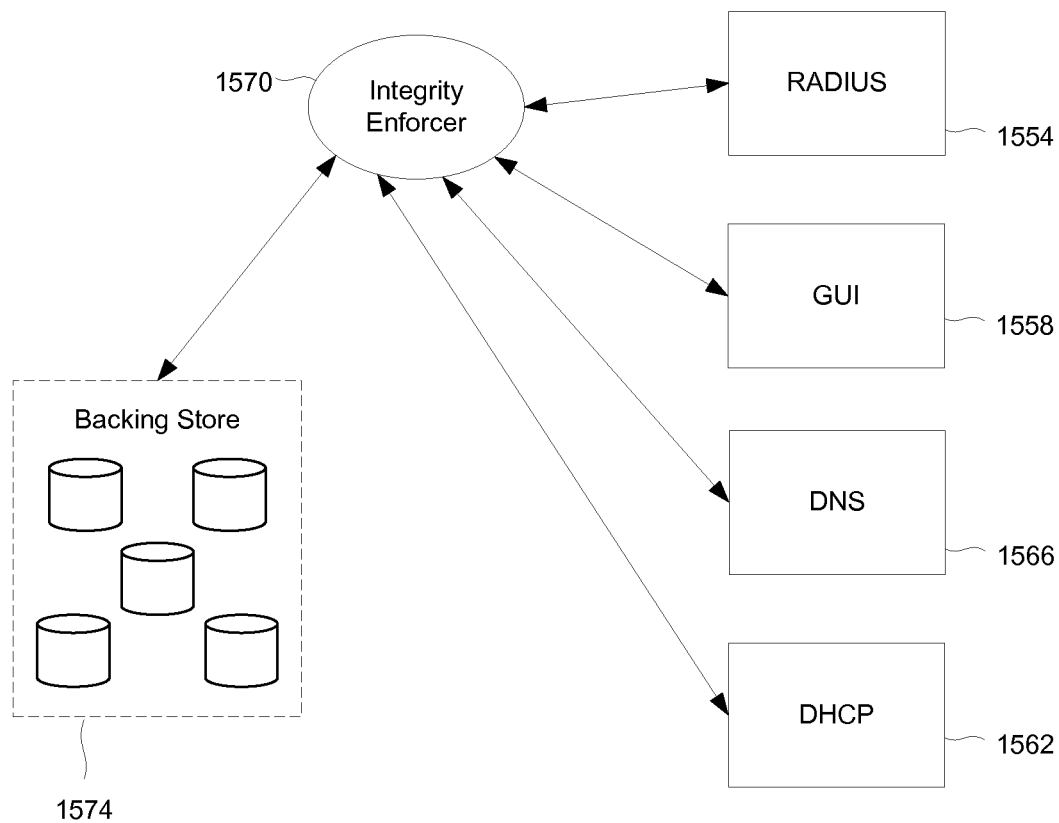
FIG. 15A is a block diagram illustrating a logical view of a backing store interacting with various network applications.
Figure 15B:
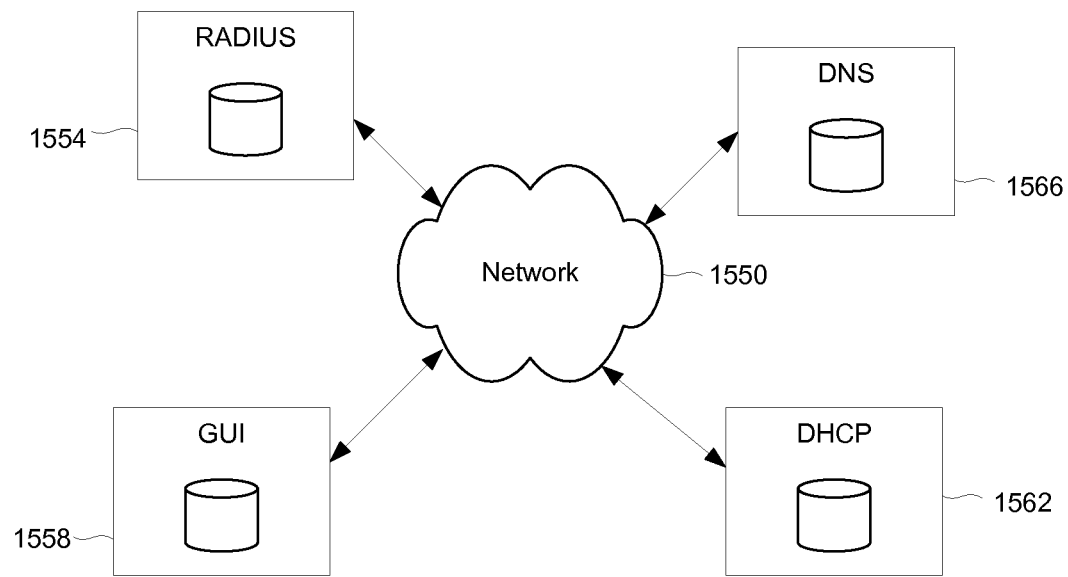
FIG. 15B is a block diagram illustrating a physical view of a backing store interacting with various network devices.

FIG. 15A is a block diagram illustrating a logical view of a backing store interacting with various network applications. Backing store 1574 is common to RADIUS server 1554, GUI device 1558, DNS server 1566, and DHCP server 1562. Integrity enforcer 1570 operates between each network device and backing store 1574 to enforce data integrity and consistency within backing store 1574, as further described below. In some embodiments, the backing store is physically distributed among more than one device. FIG. 15B is a block diagram illustrating a physical view of a backing store interacting with various network devices. The backing store is common to RADIUS server 1554, GUI device 1558, DNS server 1566, and DHCP server 1562. In this example, RADIUS server 1554, GUI device 1558, DNS server 1566, and DHCP server 1562 each store a portion of the backing store, but the backing store may be distributed in other ways. Similarly, the integrity enforcer is distributed as appropriate among the network devices.

Figure 15C:
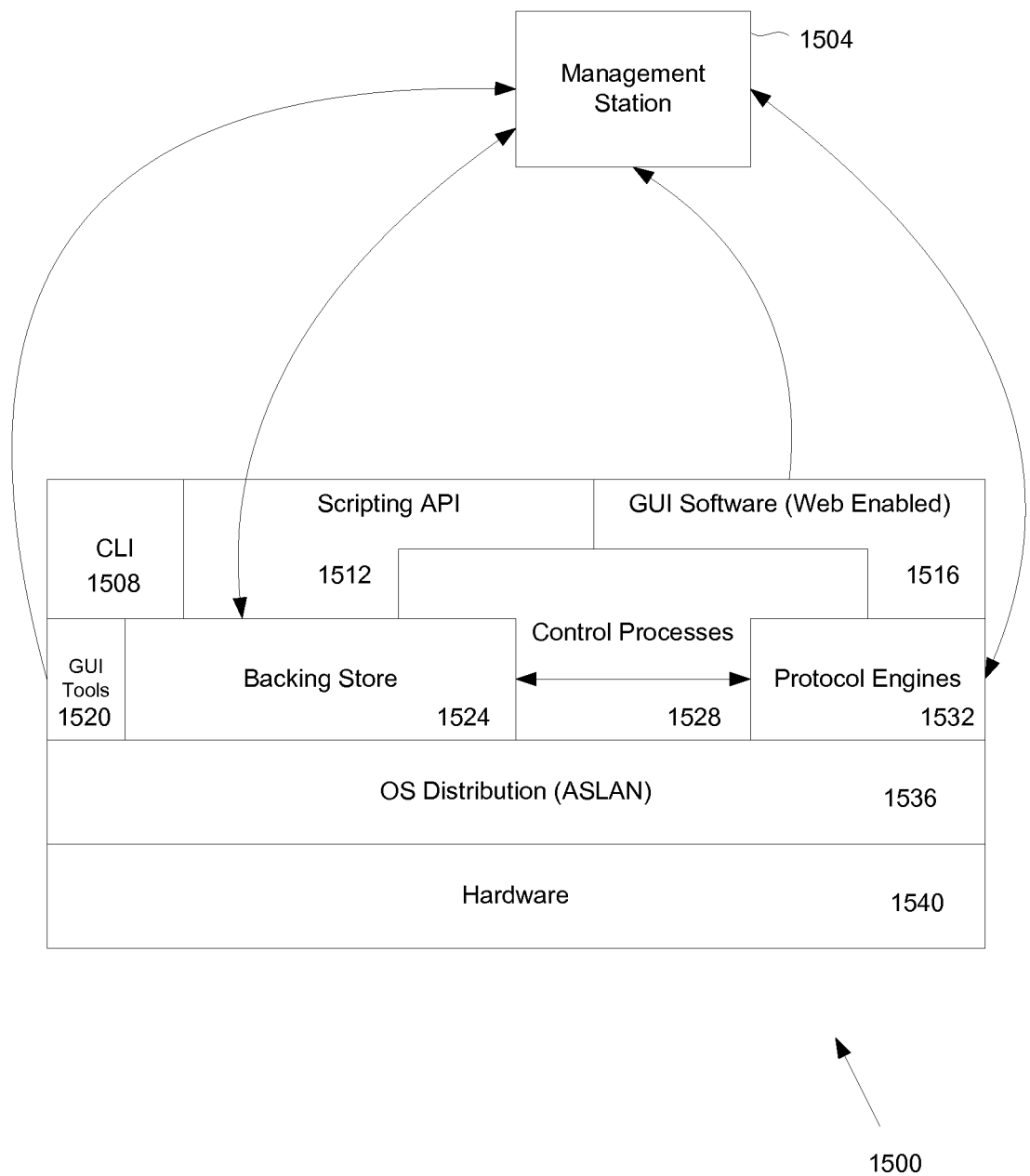
FIG. 15C is a block diagram illustrating a network device including a backing store.

FIG. 15C is a block diagram illustrating a network device including a backing store. Network device 1500 is shown to include a command line interface (CLI) 1508, scripting application program interface (API) 1512, graphical user interface (GUI) software 1516, GUI tools 1520, backing store 1524, control processes 1528, protocol engines 1532, OS distribution 1536, and hardware 1540. Backing store 1524 is physically distributed among one or more devices. The state of backing store 1524 may be manipulated using GUI tools 1520, CLI 1508, scripting API 1512, GUI software 1516, protocol engines 1532, or other appropriate applications (not shown). Protocol engines 1532 interact with backing store 1528 through a translation mechanism provided by control processes 1528. In some embodiments, OS distribution 1536 is a proprietary Linux-based software package.

A management station 1504 may interact with hardware device 1500 to manipulate backing store 1524. For example, GUI software 1516 and GUI tools 1520 may be downloaded to management station 1504 to allow for an interactive session with the backing store. Management station 1504 may also open a connection with one of protocol engines 1532, which may include for example, DNS, SNMP, RADIUS, or HTTP engines.

Figure 16:
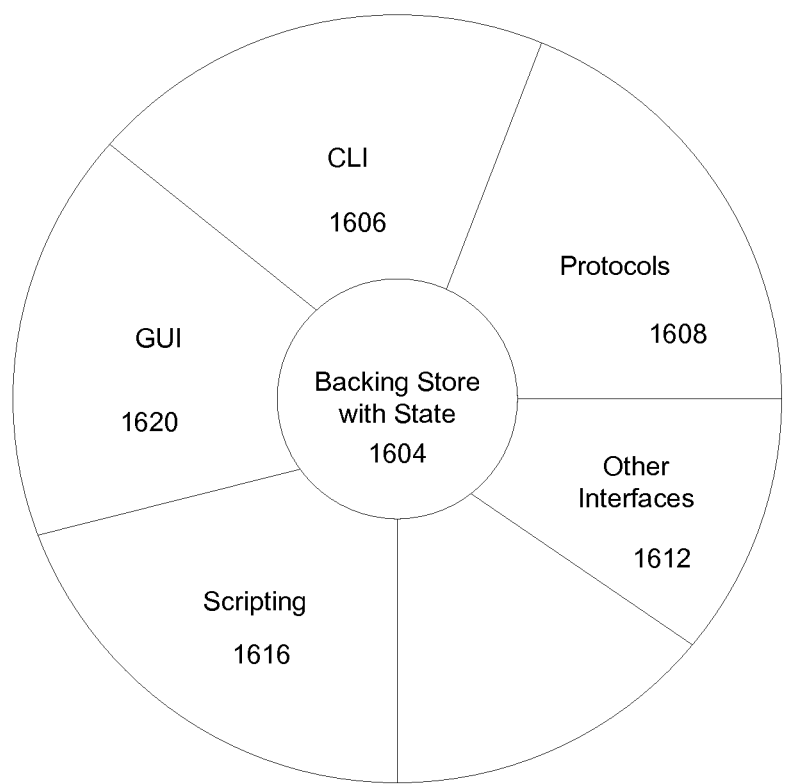
FIG. 16 is a conceptual diagram illustrating various interfaces that may be used to communicate with a backing store.

The state of backing store 1524 may be changed through any appropriate application. FIG. 16 is a conceptual diagram illustrating various interfaces that may be used to communicate with backing store 1604. Examples of interface applications include CLI 1606, protocols 1608, GUI 1620, and scripting tools 1616. Any other appropriate applications 1612 may also be used. Examples of protocols 1608 include DHCP, SNMP, DNS, and LDAP. These applications are shown to surround backing store 1604 since they act as interfaces to backing store 1604. Each application may have a different view of backing store 1604. The applications do not need to be aware of the fact that they are all accessing or modifying the same backing store 1604. For example, backing store 1604 may appear to each application as the data store normally associated with the application. A data store, as used herein, refers to any memory associated with a computer that may be used for storing data, including manual files, machine readable files, and databases. In some embodiments, backing store 1604 includes automatically created adapters to interface with different applications.

The state of the system can be defined by backing store 1604. Thus the entire system can be replicated based on the state of backing store 1604. In some embodiments, backing store 1604 is an orthogonally persistent distributed partially ordered (OPDP) data store that supports accessing data with both relational and hierarchical requirements. A data description language, such as a version of Extensible Markup Language (XML), may be used to define data structures and data integrity rules within backing store 1604. Data integrity rules may include, for example, rules for interoperation among the data structures and precedence rules. In some embodiments, an XML-based data description language is used to configure rules for integrity checking, monitoring, and data consistency. For example, a DNS server includes records of IP addresses and symbolic names, and an LDAP server includes records of MAC addresses, IP addresses, and symbolic names. If a DNS server record with a particular IP address is deleted, a data integrity rule specifies what happens to the LDAP server record with that IP address.

Figure 17:
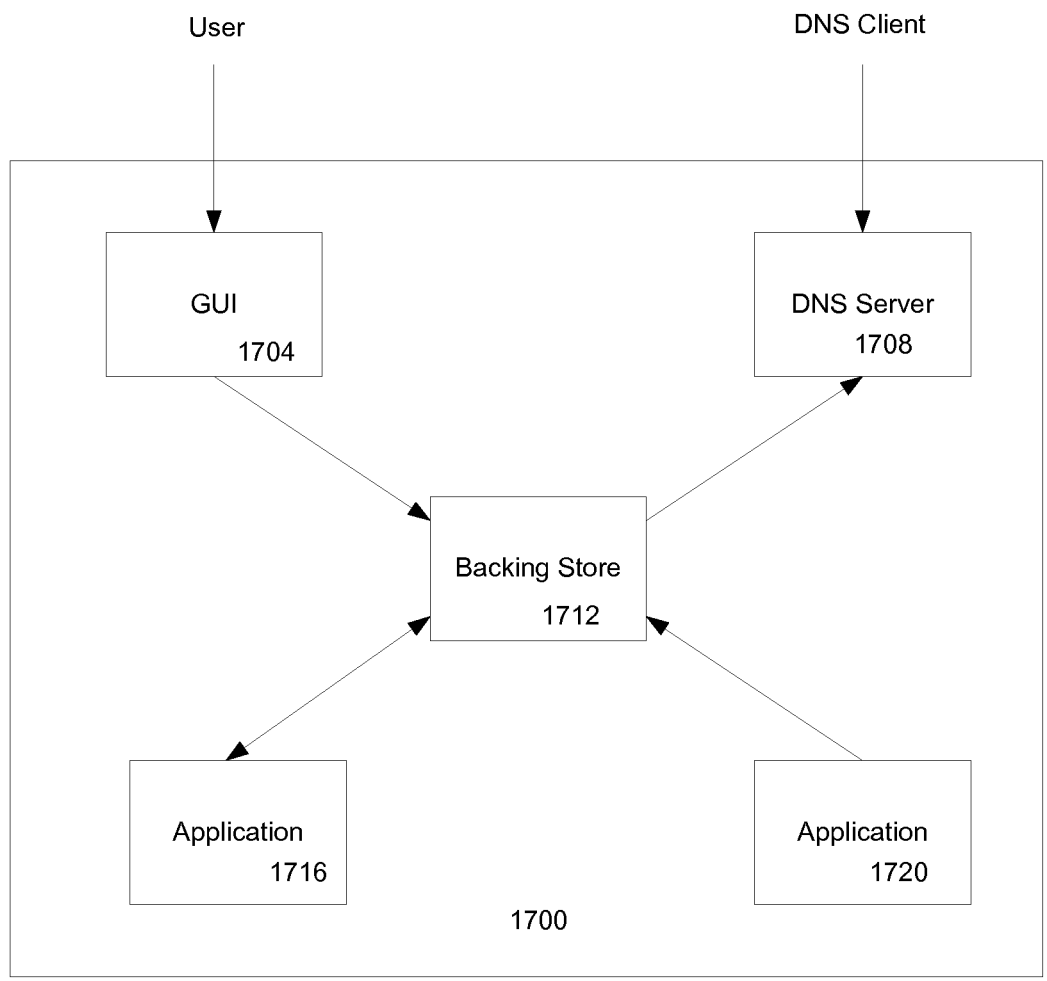
FIG. 17 is a conceptual diagram illustrating interactions between various processes and a backing store.

FIG. 17 is a conceptual diagram illustrating interactions between various processes and a backing store. In this example, device 1700 is shown to include backing store 1712 interacting with various processes, including GUI 1704, DNS server 1708, and other processes 1716 and 1720. A user interacts with GUI 1704 and a DNS client is connected to DNS server 1708. The user may insert data into backing store 1712 through GUI 1704. After the data is inserted, it is immediately visible to DNS server 1708. The DNS client may request the inserted data. If the DNS client attempts to delete a portion of that data, that request may be denied depending on the rules specified by the data description language.

Figure 18A:
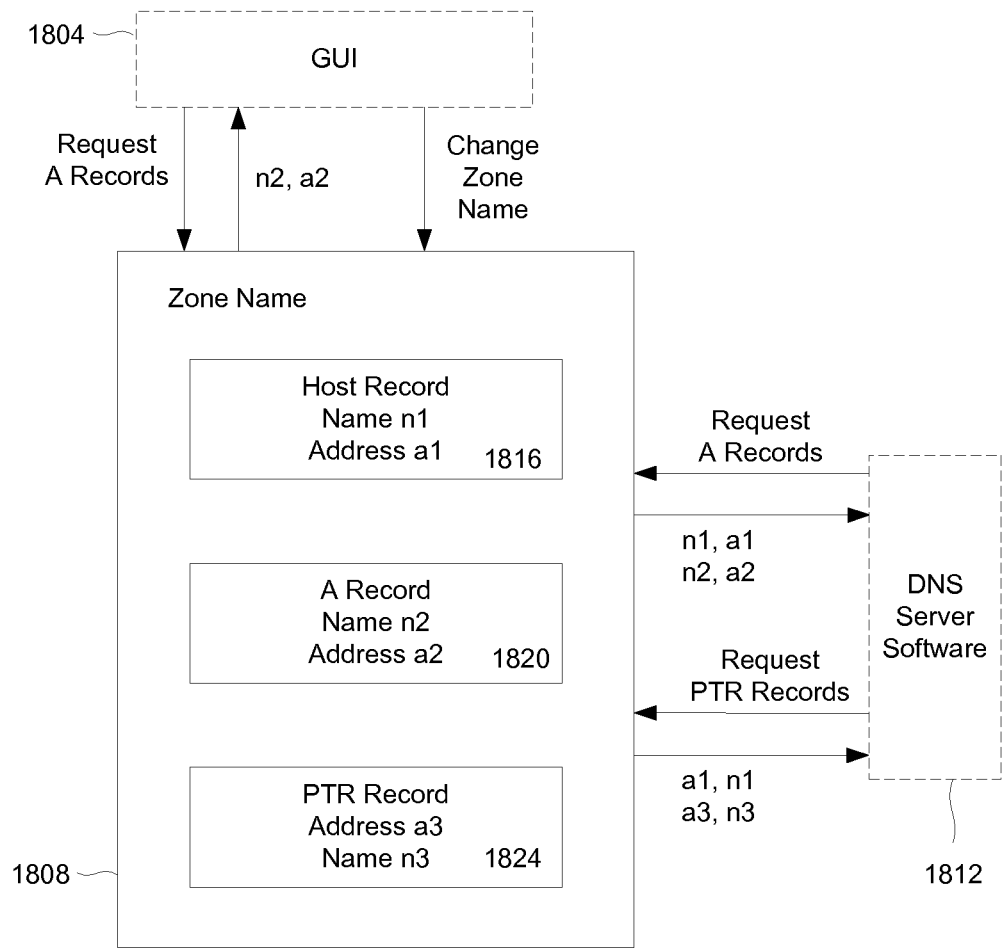
FIGS. 18A-18B are block diagrams illustrating interactions between a backing store and two network applications.
Figure 18B:
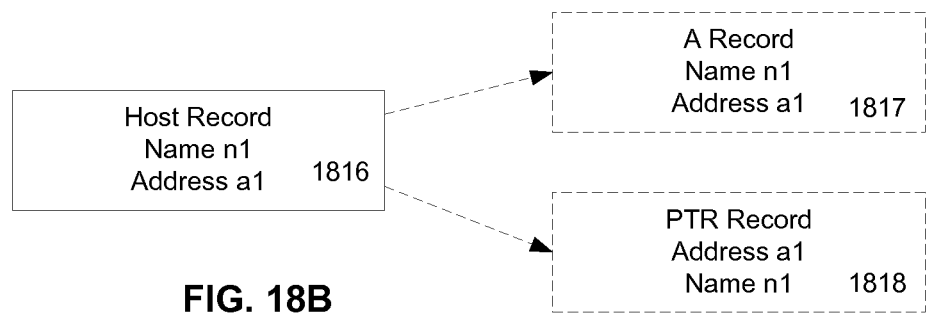

FIGS. 18A-18B are block diagrams illustrating interactions between a backing store and two network applications. The two network applications illustrated in this example are GUI 1804 and DNS server software 1812. In some embodiments, DNS server software 1812 is Berkeley Internet Name Domain (BIND). In some embodiments, backing store 1808 is logically central, but physically distributed. In this example, backing store 1808 is shown to include a Host record 1816, an A record 1820, and a PTR record 1824. As shown, Host record 1816 includes a Name and an Address. A record 1820 includes a Name mapping to an Address. PTR record 1824 includes an Address mapping to a Name. A Name may be a host name, such as "www.companyname.com" or "mail.companyname.com". An Address may be an IP address, such as "10.0.1.5". Host record 1816, A record 1820, and PTR record 1824 may be associated with a Zone name. A Zone name may be a domain name, such as "companyname.com".

GUI 1804 can view the three record types shown, whereas DNS server software 1812 can only view A records and PTR records. For example, a user can request to view Host records, A records, or PTR records via GUI 1804. In contrast, DNS server software 1812 can request to view A records or PTR records. For example, when a mapping from a name to an address is needed, DNS server software 1812 may request an A record to perform that mapping. There is no need for DNS server software 1812 to view Host records, as the DNS server is not concerned with maintaining data integrity.

FIG. 18B is a conceptual diagram illustrating how a host record inherently includes an A record and a PTR record. In this example, Host record 1816 is shown to map to A record 1817 and PTR record 1818. This mapping may be performed according to a translation rule provided by a data description language. Accordingly, DNS server software 1812 also can view A records and PTR records within Host records. The data description language can define various records that may map to other records. As used herein, a parent record includes a record that maps to another record, or child record.

Figure 19:
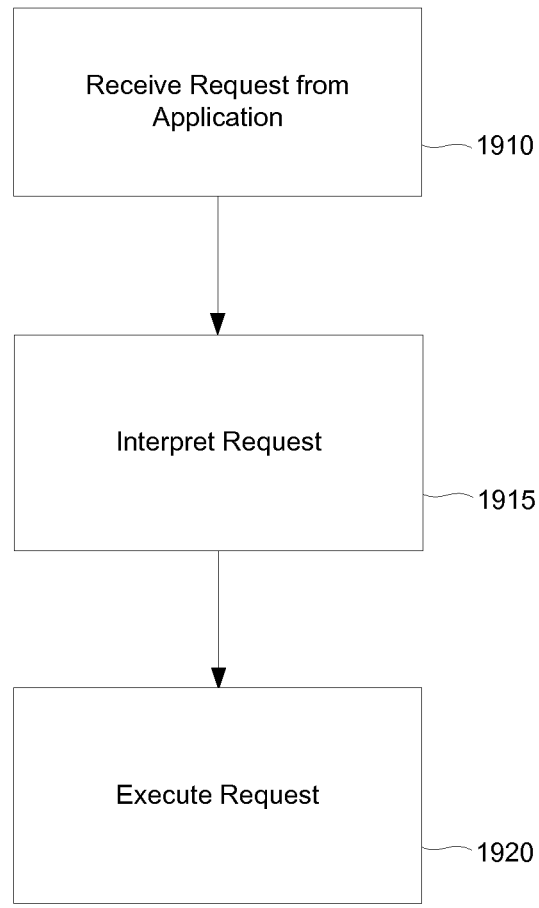
FIG. 19 is a flowchart illustrating an interaction between an application and a backing store.

As shown, an application can request or modify records within backing store 1808. Various examples of these interactions are described in conjunction with FIGS. 19-21C. FIG. 19 is a flowchart illustrating an interaction between an application and a backing store. In this example, a request from an application, such as GUI 1804 or DNS server software 1812, is received (1910). For example, the request may be a request to access, modify, or delete data in a backing store, such as backing store 1808. The request is then interpreted (1915). The request may be interpreted based on a data description language, such as an XML-based description language. For example, the request may be interpreted according to rules of the language and the application that sent the request. The request is executed (1920). Executing may include accessing, modifying, or deleting data in the backing store.

Figure 20A:
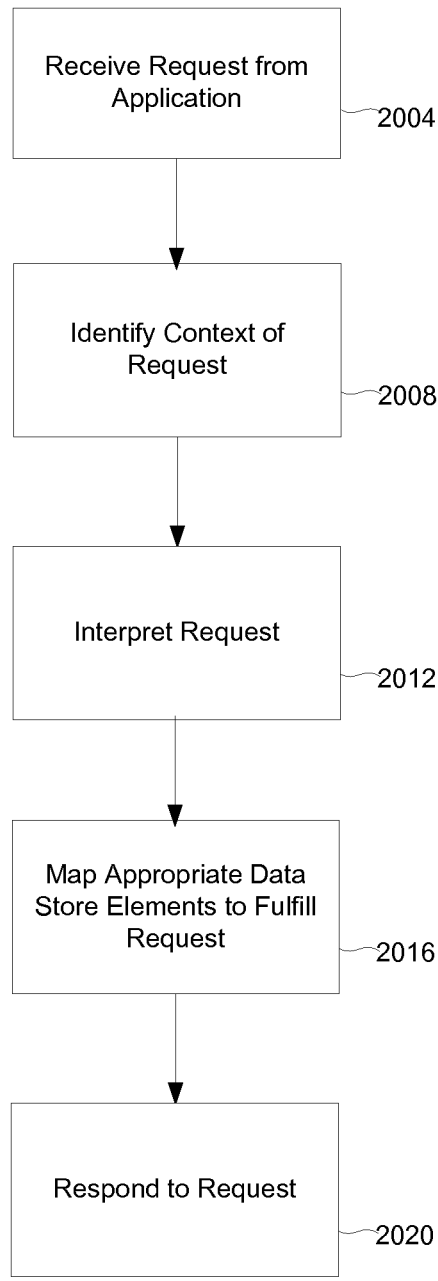
FIG. 20A is a flowchart illustrating a request to access a record within a backing store.
Figure 20B:
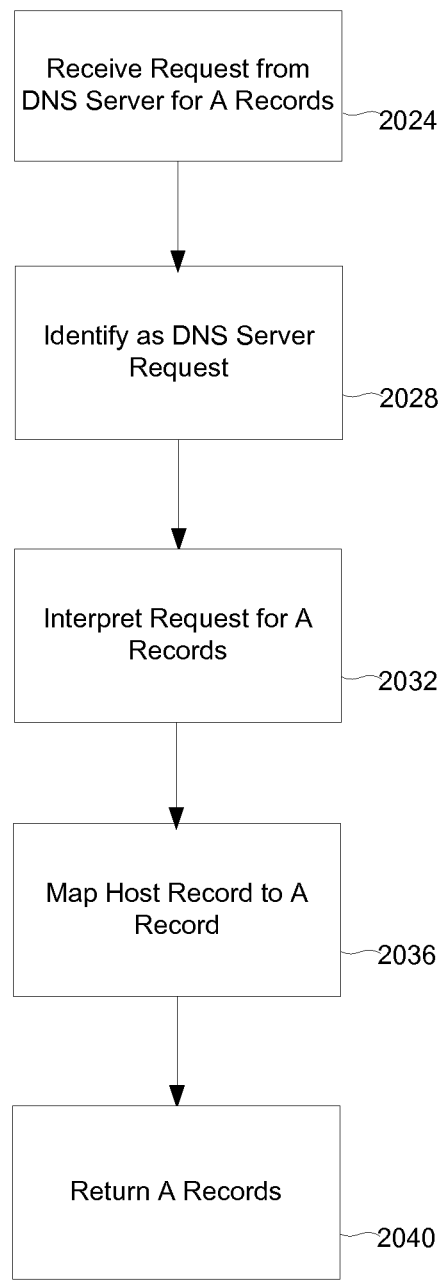
FIG. 20B is a flowchart illustrating a DNS server requesting A records.
Figure 20C:
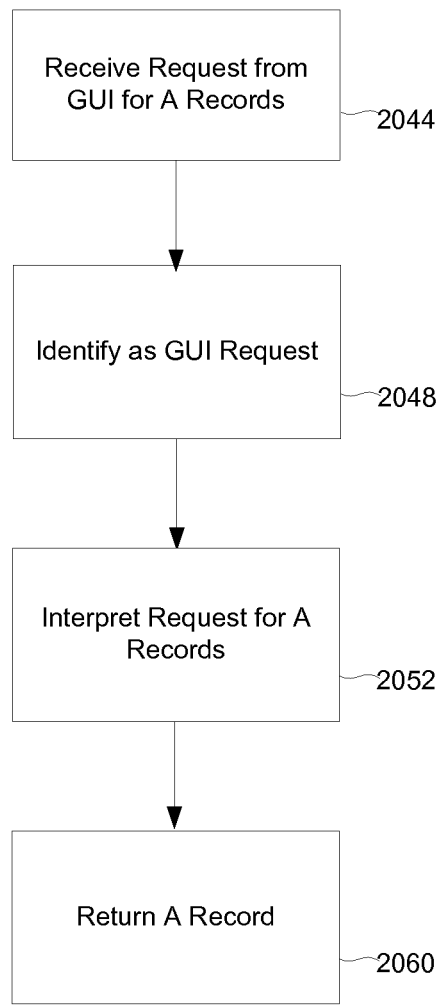
FIG. 20C is a flowchart illustrating a GUI requesting A records.

FIG. 20A is a flowchart illustrating a request to access a record within a backing store. FIGS. 20B-20C are flowcharts illustrating specific examples of such requests. As shown in FIG. 20A, a request is received from an application (2004). The context of the request is identified (2008). For example, the application that sent the request is identified. The request is interpreted (2012). For example, it is determined what types of data store elements are visible to the application that sent the request. Appropriate data store elements are mapped to fulfill the request (2016). This mapping may be performed according to a translation rule provided by a data description language. Examples of data store elements include Host records, A records, and PTR records. A response to the request is sent (2020). Specific examples are shown in FIGS. 20B-20C.

FIG. 20B is a flowchart illustrating a DNS server requesting A records. For example, DNS server software 1812 may request A records from backing store 1808, as shown in FIG. 18. Initially, a request for A records is received from a DNS server (2024). The request is identified as a DNS server request (2028) and the request is interpreted (2032). Because the DNS server can view A records and not Host records, Host records are mapped to A records (2036). All A records are then returned (2040). For example, as shown in FIG. 18, A record 1817 (n1, a1) and A record 1820 (n2, a2) are returned in response to the request for A records from DNS server software 1812. Analogously, when DNS server software 1812 requests PTR records, PTR record 1818 (a1, n1) and PTR record 1824 (a3, n3) are returned, as shown in FIG. 18.

FIG. 20C is a flowchart illustrating a GUI requesting A records. For example, GUI 1804 may request A records from backing store 1808, as shown in FIG. 18. Initially, a request for A records is received from a GUI (2044). The request is identified as a GUI request (2048) and the request is interpreted (2052). The GUI can view both A records and Host records. As such, there is no need to map Host records to A records. All A records are then returned (2060). For example, as shown in FIG. 18, A record 1820 (n2, a2) is returned in response to the request for A records from GUI 1804. Analogously, when GUI 1804 requests PTR records, PTR record 1824 (a3, n3) is returned.

Figure 21A:
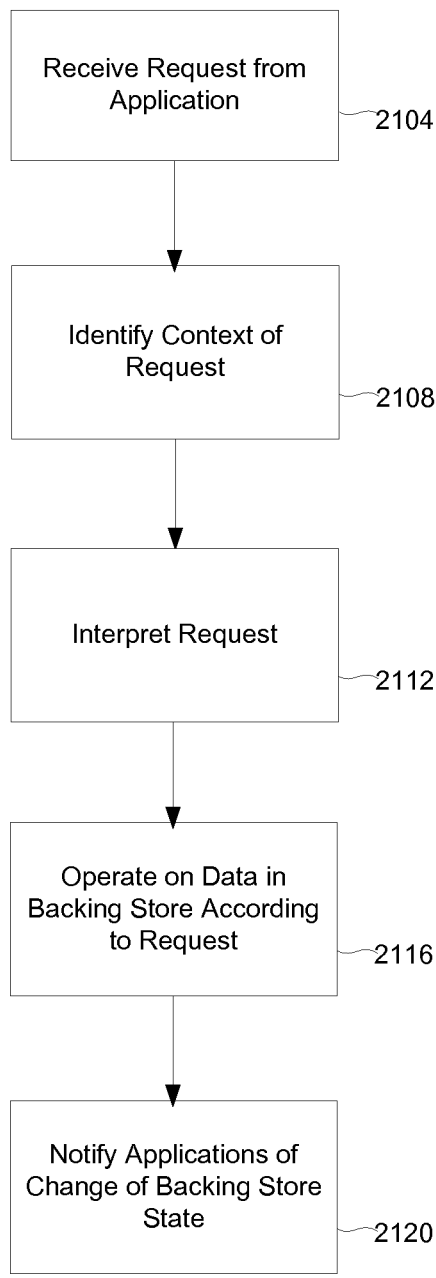
FIG. 21A is a flowchart illustrating a request to modify or delete a record within a backing store.
Figure 21B:
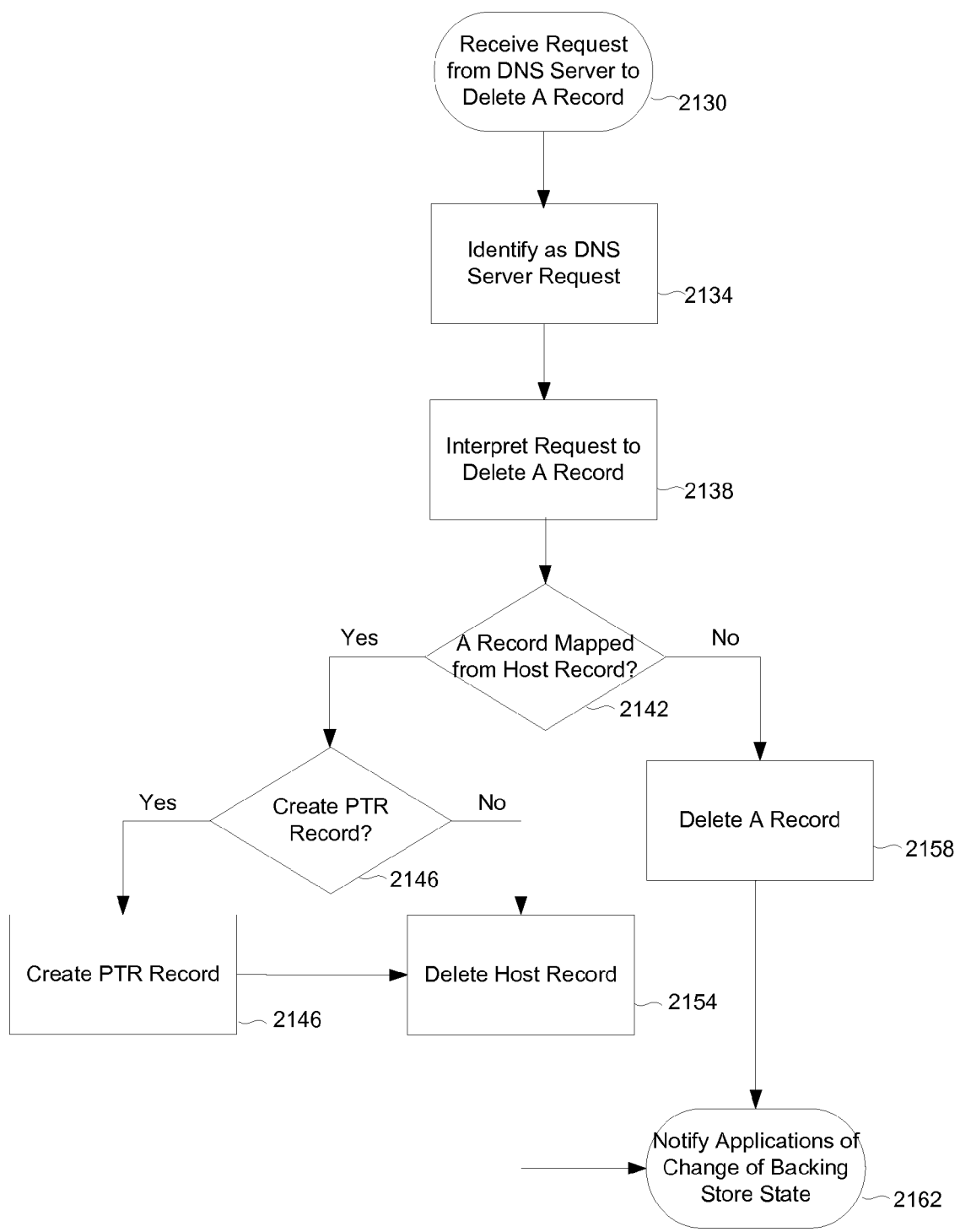
FIG. 21B is a flowchart illustrating a DNS server requesting the deletion of an A record.
Figure 21C:
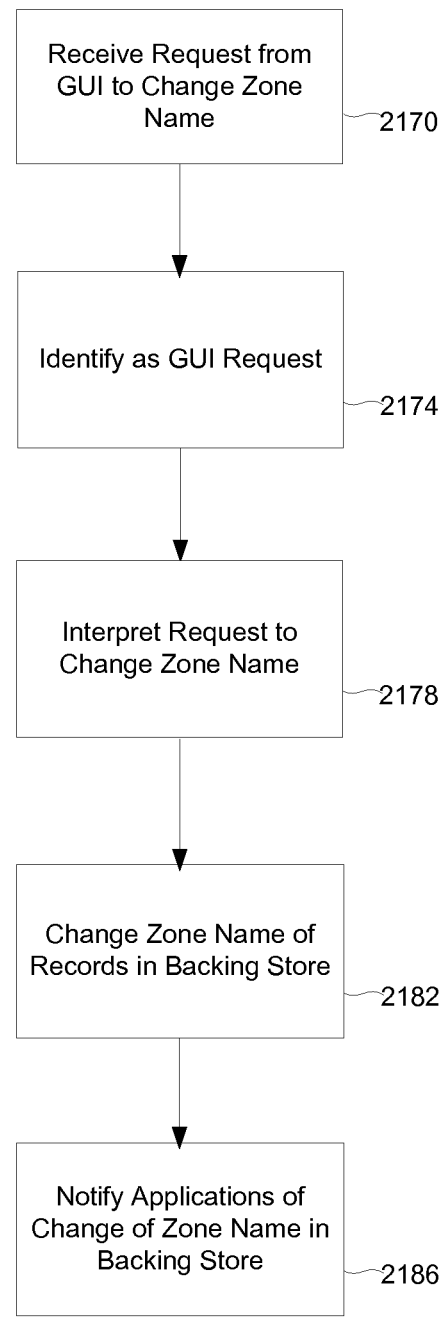
FIG. 21C is a flowchart illustrating a GUI requesting a Zone name change.

FIG. 21A is a flowchart illustrating a request to modify or delete a record within a backing store. FIGS. 21B-21C are flowcharts illustrating specific examples of such requests. As shown in FIG. 21A, a request is received from an application (2104). The context of the request is identified (2108). For example, the application that sent the request is identified. The request is interpreted (2112). For example, it is determined what types of data store elements are visible to the application that sent the request. The data in the backing store is operated on according to the request (2116). For example, a record may be modified or deleted. Applications are notified of any change in backing store state as appropriate (2162). Specific examples are shown in FIG. 21B-21C.

FIG. 21B is a flowchart illustrating a DNS server requesting the deletion of an A record. For example, DNS server software 1812 may request the deletion of A record 1817 or A record 1820 from backing store 1808 in FIG. 18. Initially, a request to delete an A record is received from a DNS server (2130). The request is identified as a DNS server request (2134) and the request is interpreted (2138). Because the DNS server can view A records and not Host records, Host records need to be mapped to A records in order for those A records to be visible to the DNS server. It is determined whether the A record to be deleted is one that is mapped from a Host record (2142). If the A record to be deleted is not one that is mapped from a Host record, such as A record 1820, the A record is deleted (2158). Applications are notified of the change in backing store state as appropriate (2162). If the A record to be deleted is one that is mapped from a Host record, such as A record 1817, it is determined whether a PTR record associated with the Host record should be created (2146). Because the A record is mapped from a Host record, in order to delete the A record, the Host record would need to be deleted. Deleting the Host record would also cause the PTR record associated with the Host record to be deleted. Accordingly, it may be desirable to create a separate PTR record (2146) before deleting the Host record (2154). In some embodiments, the determination (2146) is based on rules within a data description language. In some embodiments, a user is prompted and the determination (2146) is based on the user's response. In some embodiments, a rule is provided a priori and the determination (2146) is based on the rule. After the Host record is deleted, applications are notified of the change in backing store state as appropriate (2162).

FIG. 21C is a flowchart illustrating a GUI requesting a Zone name change. For example, GUI 1804 may request the Zone name associated with Host record 1816, A record 1820, and PTR record 1824 to be changed, as shown in FIG. 18. Initially, a request to change a Zone name is received from a GUI (2170). The request is identified as a GUI request (2174) and the request is interpreted (2178). The Zone name of records in the backing store is changed appropriately (2182). For example, in FIG. 18, assuming n1 is "mail.companyname.com" and n2 is "ftp.companyname.com", when GUI 1804 requests to change the Zone name to "newname.com", n1 becomes "mail.newname.com" and n2 becomes "ftp.newname.com". Each record is updated to reflect the change. Applications are notified appropriately of the change of Zone name in the backing store (2186).

Similarly, the examples above can apply to RADIUS, Lightweight Directory Access Protocol (LDAP), Kerberos, Public Key Infrastructure (PKI), or any other appropriate network applications. For example, in a RADIUS application, realm and user structures can replace the zone and host structures in the above examples. In an LDAP application, directory and policy structures can replace the zone and host structures. A mixed application, such as authenticated dynamic DNS, may interact with the backing store. Authenticated dynamic DNS mixes RADIUS, DHCP, and DNS.

Figure 22A:
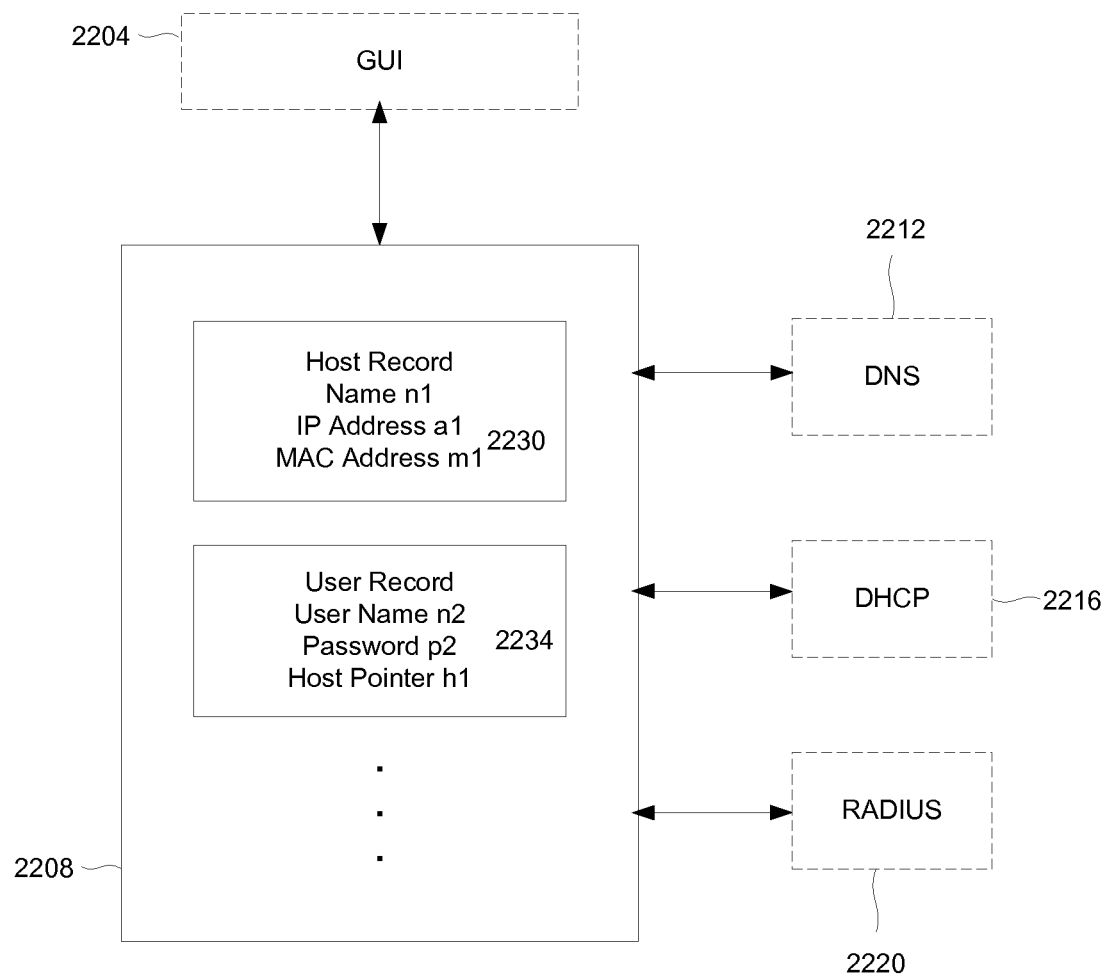
FIG. 22A is a block diagram illustrating a backing store for performing authenticated dynamic DNS.

FIG. 22A is a block diagram illustrating a backing store for performing authenticated dynamic DNS. In some embodiments, backing store 1808 is logically central, but physically distributed. In this example, backing store 1808 is shown to include a Host record 2230 and a User record 2234. As shown, Host record 2230 includes a Name, an IP Address, and a MAC Address. User record 2234 includes a Username, Password, and Host Record Pointer. A Name may be a host name, such as "www.companyname.com" or "mail.companyname.com".

GUI 2204 can view all record types. Each network application has a filtered view of the data store. RADIUS application 2220 can view User record 2234. DNS application 2212 can view an A record and a PTR record, which map from Host record 2230, as described above. DHCP application 2216 can view a Lease record, which includes an IP Address and a MAC Address. A Lease record is mapped from a Host record similar to how an A record is mapped from a Host record.

Figure 22B:
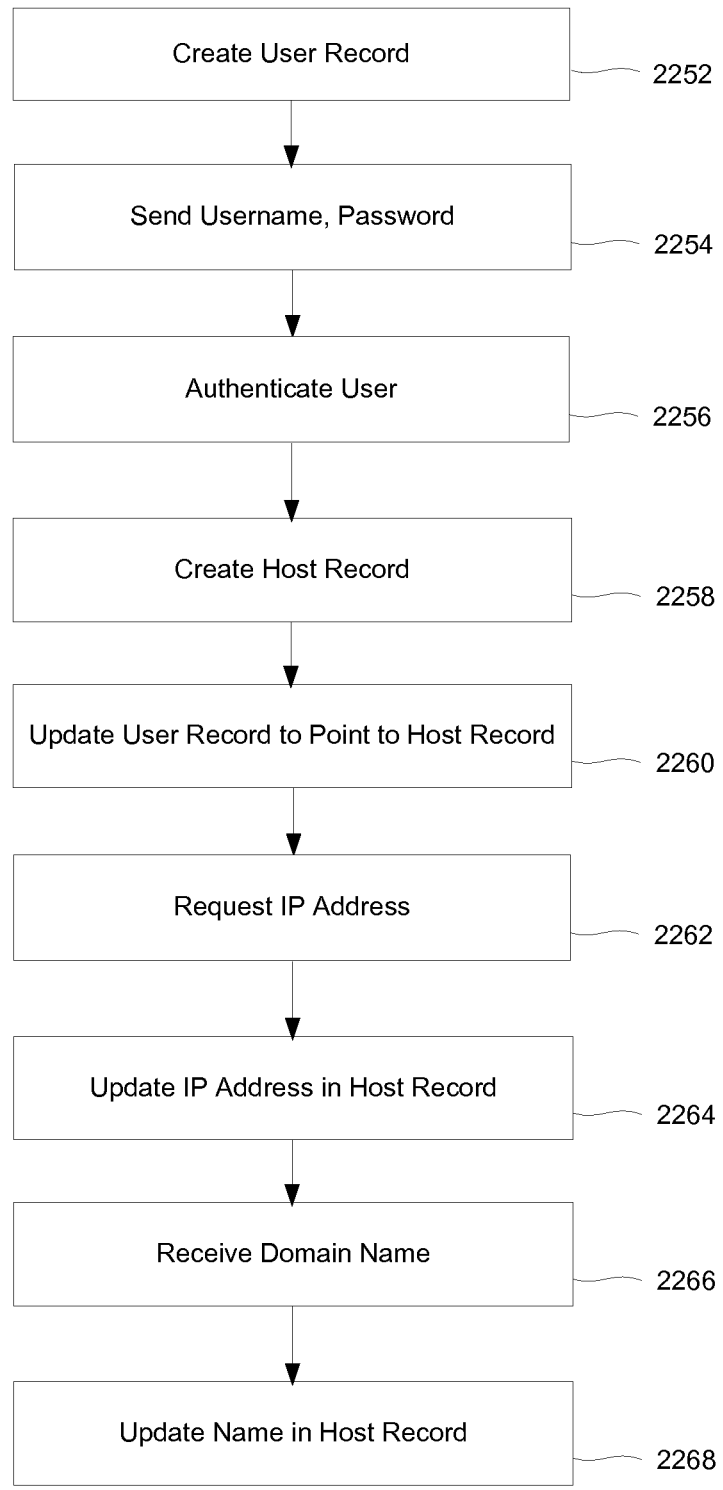
FIG. 22B is a flowchart illustrating a method of performing authenticated dynamic DNS.

FIG. 22B is a flowchart illustrating a method of performing authenticated dynamic DNS. For example, this method may be performed by the system shown in FIG. 22A. First, a User record is created (2252). For example, an administrator may provision a new user into a system. The User record includes a username and password. Once the User record is provisioned, the user may login from a device such as a laptop. A username and password are sent (2254) from the laptop to a RADIUS application. The user is authenticated (2254) by the RADIUS application. A Host record is created (2258). The Host record includes a Name, IP Address, and MAC Address. The MAC Address is the MAC address of the user device. For example, the MAC address of the user device may be sent by the user during login. The Name and IP Address of the Host record are empty at this point. Now that the Host record is created, the User record is updated to include a pointer to the Host record (2260). For example, the Host Pointer in User record 2234 may point to Host record 2230. An IP Address is requested (2262). For example, the user device may request an IP address from the DHCP application. An IP Address is leased to the device and the Host record is updated with the IP Address (2264). Similarly, a domain name is provided (2266) by the DNS application. The Host record is updated with the domain name (2268). The Host record fields are now populated and can be viewed by a GUI application. The DHCP application cannot view the Host record, but can view the Lease record (MAC Address and IP Address) mapped from the Host record. Similarly, the RADIUS and DNS applications each have filtered views of the Host record.

When deleting a record, other records may be affected. For example, a request to delete a Realm record may be received. A Realm record includes User records. It may be that the User records and associated Host records should be deleted, but not other records that are associated with the Realm, such as Zone records and Network records. Such rules can be preconfigured in the system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of maintaining consistent Domain Name System (DNS) information, including:
receiving information associated with a network resource, wherein the received information includes a host name or an IP address associated with the network resource;
populating a resource record with the received information associated with the network resource, wherein the network resource is a host, wherein the resource record is a host record, wherein the resource record includes a forward mapping of the network resource mapping a host name information of the network resource to an IP address information of the network resource and a reverse mapping of the network resource mapping the IP address information of the network resource to the host name information of the network resource;
in response to receiving a request for a desired resource record and using a processor, deriving view information from the resource record for the desired resource record and providing the desired resource record, wherein the view information includes the host name or the IP address; and
detecting a conflict between the received information and other information, wherein the conflict can be detected in order to maintain consistent DNS information, wherein the detecting of the conflict between the received information and other information comprises:
in the event that the received information associated with the network resource relates to modifying the host:
determining whether the host record of the received record matches a host record with the same fully qualified domain name (FQDN) of the other information;
in the event that the host record of the received record is different from the host record with the same FQDN of the other information:
updating the host record with the same FQDN of the other information based on the host record of the received record, wherein the updated host record includes a new host name, a new IP address, or a combination thereof;
in the event that the updated host record includes a new IP address, determining whether the host record with the same FQDN of the other information should reference a different reverse zone;
in the event that the host record with the same FQDN of the other information should reference a different reverse zone, changing a reverse zone referenced by the host record with the same FQDN of the other information; and
maintaining an index of host names or IP addresses that are in use.

2. The method of claim 1, further comprising receiving a request to access the view information.

3. The method of claim 1, wherein the view information includes an address record (A record) or a pointer record (PTR record), and wherein the forward mapping is an A record and the reverse mapping is a PTR record for the network resource.

4. The method of claim 1, wherein the resource record already exists.

5. The method of claim 1, further comprising generating the resource record.

6. The method of claim 1, further comprising either causing the resource record to reference an object or causing an object to reference the resource record.

7. The method of claim 1, further comprising either causing the resource record to reference an object or causing an object to reference the resource record, wherein the object comprises a zone.

8. The method of claim 1, wherein the information is received from a Graphic User Interface, programming interface, script, or protocol.

9. The method of claim 1, further comprising:
determining a deepest zone, the deepest zone being a lowest leaf in a reverse zone tree under which the resource record can be placed.

10. A system for maintaining consistent Domain Name System (DNS) information, comprising:
a processor configured to:
receive information associated with a network resource, wherein the received information includes a host name or an IP address associated with the network resource;
populate a resource record with the received information associated with the network resource, wherein the network resource is a host, wherein the resource record is a host record, wherein the resource record includes a forward mapping of the network resource mapping a host name information of the network resource to an IP address information of the network resource and a reverse mapping of the network resource mapping the IP address information of the network resource to the host name information of the network resource;
in response to receiving a request for a desired resource record, derive view information from the resource record for the desired resource record and providing the desired resource record, wherein the view information includes the host name or the IP address; and
detect a conflict between the received information and other information, wherein the conflict can be detected in order to maintain consistent DNS information, wherein the detecting of the conflict between the received information and other information comprises:
in the event that the received information associated with the network resource relates to modifying the host:
determine whether the host record of the received record matches a host record with the same fully qualified domain name (FQDN) of the other information;
in the event that the host record of the received record matches the host record with the same FQDN of the other information:
update the host record with the same FQDN of the other information based on the host record of the received record, wherein the updated host record includes a new host name, a new IP address, or a combination thereof;
in the event that the updated host record includes a new IP address, determine whether the host record with the same FQDN of the other information should reference a different reverse zone;
in the event that the host record with the same FQDN of the other information should reference a different reverse zone, change a reverse zone referenced by the host record with the same FQDN of the other information; and
maintain an index of host names or IP addresses that are in use; and
a memory coupled with the processor, wherein the memory provides the processor with instructions.

11. The system recited in claim 10, wherein the processor is further configured to receive a request to access the view information.

12. The system recited in claim 10, wherein the view information includes an address record (A record) or a pointer record (PTR record), and wherein the forward mapping is an A record and the reverse mapping is a PTR record for the network resource.

13. The system recited in claim 10, wherein the resource record already exists.

14. The system recited in claim 10, wherein the processor is further configured to generate the resource record.

15. The system recited in claim 10, wherein the processor is further configured to either cause the resource record to reference an object or cause an object to reference the resource record.

16. The system recited in claim 10, wherein the processor is further configured to either cause the resource record to reference an object or cause an object to reference the resource record, wherein the object comprises a zone.

17. The system recited in claim 10, wherein the information is received from a Graphic User Interface, programming interface, script, or protocol.

18. The system recited in claim 10, wherein the processor is further configured to:
determine a deepest zone, the deepest zone being a lowest leaf in a reverse zone tree under which the resource record can be placed.

19. A computer program product for maintaining consistent Domain Name System information, the computer program product being embodied in a non-transitory computer readable medium and comprising computer instructions for:
receiving information associated with a network resource, wherein the received information includes a host name or an IP address associated with the network resource;
populating a resource record with the received information associated with the network resource, wherein the network resource is a host, wherein the resource record is a host record, wherein the resource record includes a forward mapping of the network resource mapping a host name information of the network resource to an IP address information of the network resource and a reverse mapping of the network resource mapping the IP address information of the network resource to the host name information of the network resource;
in response to receiving a request for a desired resource record, deriving view information from the resource record for the desired resource record and providing the desired resource record, wherein the view information includes the host name or the IP address; and
detecting a conflict between the received information and other information, wherein the conflict can be detected in order to maintain consistent DNS information, wherein the detecting of the conflict between the received information and other information comprises:
in the event that the received information associated with the network resource relates to modifying the host:

determining whether the host record of the received record matches a host record with the same fully qualified domain name (FQDN) of the other information;

in the event that the host record of the received record matches the host record with the same FQDN of the other information:

updating the host record with the same FQDN of the other information based on the host record of the received record, wherein the updated host record includes a new host name, a new IP address, or a combination thereof;

in the event that the updated host record includes a new IP address, determining whether the host record with the same FQDN of the other information should reference a different reverse zone;

in the event that the host record with the same FQDN of the other information should reference a different reverse zone, changing a reverse zone referenced by the host record with the same FQDN of the other information; and maintaining an index of host names or IP addresses that are in use.

20. The computer program product recited in claim 19, further comprising computer instructions for receiving a request to access the view information.

21. The computer program product recited in claim 19, wherein the view information includes an address record (A record) or a pointer record (PTR record), and wherein the forward mapping is an A record and the reverse mapping is a PTR record for the network resource.

22. The computer program product recited in claim 19, wherein the resource record already exists.

23. The computer program product recited in claim 19, further comprising computer instructions for generating the resource record.

24. The computer program product recited in claim 19, further comprising computer instructions for either causing the resource record to reference an object or causing an object to reference the resource record.

25. The computer program product recited in claim 19, further comprising computer instructions for either causing the resource record to reference an object or causing an object to reference the resource record, wherein the object comprises a zone.

26. The computer program product recited in claim 19, wherein the information is received from a Graphic User Interface, programming interface, script, or protocol.

27. The computer program product recited in claim 19, further comprising computer instructions for:

determining a deepest zone, the deepest zone being a lowest leaf in a reverse zone tree under which the resource record can be placed.

* * * * *